US012763839B2

(12) United States Patent
Abebe et al.

(10) Patent No.: US 12,763,839 B2

(45) Date of Patent: Oct. 13, 2026

(54) METHOD AND APPARATUS FOR CODEBOOK SUBSET RESTRICTION

(71) Applicant: SAMSUNG ELECTRONICS CO., LTD., Suwon-si (KR)

(72) Inventors: Ameha Tsegaye Abebe, Suwon-si (KR); Younsun Kim, Suwon-si (KR); Seongmok Lim, Suwon-si (KR); Youngrok Jang, Suwon-si (KR); Kyungjun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 18/448,059

(22) Filed: Aug. 10, 2023

(65) Prior Publication Data

US 2024/0056156 A1 Feb. 15, 2024

(30) Foreign Application Priority Data

Aug. 12, 2022 (KR) ........................ 10-2022-0101024

(51) Int. Cl.
*H04B 7/06* (2006.01)
*H04L 5/00* (2006.01)

(52) U.S. Cl.
CPC ......... *H04B 7/0663* (2013.01); *H04B 7/0626* (2013.01); *H04B 7/0639* (2013.01); *H04L 5/0053* (2013.01)

(58) Field of Classification Search
CPC .. H04B 7/0663; H04B 7/0626; H04B 7/0639; H04L 5/0053
See application file for complete search history.

(56) References Cited

U.S. PATENT DOCUMENTS

| | | | | |
|---|---|---|---|---|
| 12,255,713 | B2 * | 3/2025 | Hao | H04L 5/0057 |
| 2019/0174440 | A1 | 6/2019 | Kwak et al. | |
| 2020/0295813 | A1 | 9/2020 | Rahman et al. | |
| 2021/0159953 | A1 * | 5/2021 | Wu | H04B 7/0658 |
| 2022/0085855 | A1 * | 3/2022 | Huang | H04B 7/0456 |
| 2022/0166469 | A1 * | 5/2022 | Faxer | H04L 5/005 |
| 2022/0255609 | A1 * | 8/2022 | Venkatesh | H04W 76/00 |

(Continued)

FOREIGN PATENT DOCUMENTS

| | | | |
|---|---|---|---|
| KR | 10-2022-0016246 A | | 2/2022 |
| WO | 2022051930 | A1 | 3/2022 |

(Continued)

OTHER PUBLICATIONS

International Search Report and Written Opinion of the International Searching Authority dated Nov. 10, 2023, in connection with International Application No. PCT/KR2023/011933, 7 pages.

(Continued)

*Primary Examiner* — Khaled M Kassim

(57) ABSTRACT

A method performed by a UE in a wireless communication system includes receiving configuration information on a CSI report including information on a codebook subset restriction, the codebook subset restriction being configured to each TRP of a plurality of TRPs performing coherent joint transmission or to a subset of the plurality of TRPs based on the information, measuring CSI based on at least one CSI-RS resource, and transmitting the CSI based on the codebook subset restriction.

12 Claims, 19 Drawing Sheets

(56) References Cited

U.S. PATENT DOCUMENTS

| | | | | |
|---|---|---|---|---|
| 2022/0263552 | A1* | 8/2022 | Hao | H04B 7/0482 |
| 2022/0302979 | A1* | 9/2022 | Hao | H04B 7/048 |
| 2022/0303919 | A1* | 9/2022 | Faxér | H04B 7/0626 |
| 2022/0368386 | A1* | 11/2022 | Brown | H04B 7/0626 |
| 2023/0239025 | A1* | 7/2023 | Park | H04L 5/0053 370/329 |
| 2024/0022303 | A1* | 1/2024 | Zhang | H04B 7/0626 |
| 2024/0030985 | A1* | 1/2024 | Yuan | H04L 5/0057 |
| 2024/0063870 | A1* | 2/2024 | Gao | H04L 5/0057 |
| 2024/0063871 | A1* | 2/2024 | Jeon | H04B 7/0626 |
| 2024/0155406 | A1* | 5/2024 | Zou | H04B 7/0639 |
| 2024/0364485 | A1* | 10/2024 | Hindy | H04B 7/063 |
| 2024/0388347 | A1* | 11/2024 | Kim | H04L 5/005 |
| 2025/0158787 | A1* | 5/2025 | Dai | H04W 24/08 |
| 2025/0183961 | A1* | 6/2025 | Huang | H04L 5/005 |
| 2025/0274799 | A1* | 8/2025 | Shibaike | H04W 24/10 |

FOREIGN PATENT DOCUMENTS

| | | | |
|---|---|---|---|
| WO | 2022073154 | A1 | 4/2022 |
| WO | 2022082701 | A1 | 4/2022 |

OTHER PUBLICATIONS

Supplementary European Search Report dated Sep. 8, 2025, in connection with European Patent Application No. 23853069.5, 12 pages.

LG Electronics: "CSI enhancements for Rel-17", 3GPP TSG RAN WG1 #106b-e, e-Meeting, Oct. 2021, R1-2110083, 8 pages.

Ericsson: "Summary", 3GPP TSG-RAN WG2 Meeting #116bis Electronic, Jan. 2022, R2-2201921, 67 pages.

* cited by examiner

A 12T12R MIMO antenna configuration with 2V3H and 48 antenna elements $N_2 O_2 \times N_1 O_1$ oversampled 2D-DFT beams for 24 ports

[1201]

[1202]

METHOD AND APPARATUS FOR CODEBOOK SUBSET RESTRICTION

CROSS-REFERENCE TO RELATED APPLICATIONS

This application is based on and claims priority under 35 U.S.C. § 119 to Korean Patent Application No. 10-2022-0101024, filed on Aug. 12, 2022, in the Korean Intellectual Property Office, the disclosure of which is herein incorporated by reference in its entirety.

BACKGROUND

1. Field

The present disclosure relates to the field of $5^{th}$ generation (5G) communication networks and more particularly to artificial intelligence-based channel state information (CSI) feedback in multiple-input multiple-output (MIMO) system.

2. Description of Related Art 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

The following documents are hereby incorporated by reference into the present disclosure as if fully set forth herein: RP-193133, New WID: Further enhancements on MIMO for NR, Samsung, 3GPP TS 38.213, V15.12.0(2020 December): “NR; Physical layer procedures for control (Release 15)”; 3GPP TS 38.214, V15.11.0 (2020 September): “NR; Physical layer procedures for data (Release 15)”;

3GPP TS 38.213, V16.4.0 (2020 December): "NR; Physical layer procedures for control (Release 16)"; 3GPP TS 38.214, V16.4.0 (2020 December); "NR; Physical layer procedures for data (Release 16)"; 3GPP TS 38.321, V16.3.0 (2020 December): "NR; Medium Access Control (MAC) protocol specification (Release 16)"; 3GPP TS 38.331, V16.3.1 (2021 January): "NR; Radio Resource Control (RRC) protocol specification"; 3GPP TS 38.211, V16.4.0 (2020 December): "NR; Physical channels and modulation"; 3GPP TS 38.212, V16.4.0 (2020 December): "NR; Multiplexing and channel coding"; and 3GPP TS 38.215, V16.4.0 (2020 December): "NR; Physical layer measurements."

SUMMARY

The principal object of the disclosure herein is to disclose methods and apparatus for codebook subset restriction (CBSR) for channel state information (CSI) reporting in communication network, wherein the communication network is at least one of the 5G standalone network, a 5G non-standalone (NAS) network or 6G network.

As specific object of the disclosure herein is to disclose methods and systems to configure a UE with codebook subset restriction (CBSR) that can be applied to a CSI reporting for coherent joint transmission from multiple transmission reception points (TRPs).

As specific object of the disclosure herein is to disclose methods and systems to configure a UE with codebook subset restriction (CBSR) that can be applied to a CSI reporting for time-correlated CSI wherein the CSI is compressed in time or Doppler domain.

As another specific object of the disclosure herein is to disclose methods and systems to configure a UE with codebook subset restriction (CBSR) that can be applied to a CSI reporting for a CSI generated based on an AI.

Another objective of the disclosure herein is for UE, upon receiving a configuration message from gNB, to report CSI by applying the restrictions indicated in the CBSR information.

The disclosure has been made to address the above-mentioned problems and disadvantages, and to provide at least the advantages described below.

In accordance with an aspect of the disclosure, a method performed by a UE in a wireless communication system is provided. The method includes receiving configuration information on a CSI report including information on a codebook subset restriction, the codebook subset restriction being configured to each TRP of a plurality of TRPs performing coherent joint transmission or to a subset of the plurality of TRPs based on the information, measuring CSI based on at least one channel state information—reference signal (CSI-RS) resource, and transmitting the CSI based on the codebook subset restriction.

In accordance with another aspect of the disclosure, a method performed by a base station in a wireless communication system is provided. The method includes transmitting, to a UE, configuration information on a CSI report including information on a codebook subset restriction, the codebook subset restriction being configured to each TRP of a plurality of TRPs performing coherent joint transmission or to a subset of the plurality of TRPs based on the information, transmitting, to the UE, at least one CSI-RS resource, and receiving, from the UE, CSI based on the codebook subset restriction, wherein the CSI is derived based on the at least one CSI-RS resource.

In accordance with another aspect of the disclosure, a UE in a wireless communication system is provided. The UE includes a transceiver and a controller coupled with the transceiver and configured to receive configuration information on a CSI report including information on a codebook subset restriction, the codebook subset restriction being configured to each TRP of a plurality of TRPs performing coherent joint transmission or to a subset of the plurality of TRPs based on the information, measure CSI based on at least one CSI-RS resource, and transmit the CSI based on the codebook subset restriction.

In accordance with another aspect of the disclosure, a base station in a wireless communication system s provided. The base station includes a transceiver and a controller coupled with the transceiver and configured to transmit, to a UE, configuration information on a CSI report including information on a codebook subset restriction, the codebook subset restriction being configured to each TRP of a plurality of TRPs performing coherent joint transmission or to a subset of the plurality of TRPs based on the information, transmit, to the UE, at least one CSI-RS resource, and receive, from the UE, CSI based on the codebook subset restriction, wherein the CSI is derived based on the at least one CSI-RS resource.

In accordance with one aspect of the disclosure, a method performed by a base station in a wireless communication system is provided. The method includes transmitting, to a UE, configuration information about CBSR for CSI report for coherent joint transmission (CJT) from multiple TRPs.

In accordance with an aspect of the disclosure, a method performed by a UE in a wireless communication system is provided. The method includes receiving, from a base station, configuration information about CBSR for CSI report for CJT from multiple TRPs.

In accordance with one aspect of the disclosure, a method performed by a base station in a wireless communication system is provided. The method includes transmitting, to a UE, configuration information about CBSR for CSI report for time-correlated CSI which is compressed either in time domain or Doppler domain.

In accordance with an aspect of the disclosure, a method performed by a UE in a wireless communication system is provided. The method includes receiving, from a base station, configuration information about CBSR for CSI report for time-correlated CSI which is compressed either in time domain or Doppler domain.

In accordance with one aspect of the disclosure, a method performed by a base station in a wireless communication system is provided. The method includes transmitting, to a UE, configuration information about CBSR for CSI report generated by a two-sided artificial intelligence/machine learning (AI/ML) model.

In accordance with an aspect of the disclosure, a method performed by a UE in a wireless communication system is provided. The method includes receiving, from a base station, configuration information about CBSR for CSI report generated by a two-sided artificial intelligence/machine learning (AI/ML) model.

The technical problems to be achieved in the embodiment of the disclosure are not limited to the technical problems mentioned above, and other technical problems not mentioned herein will be clearly understood from the following description by those skilled in the art to which the disclosure belongs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
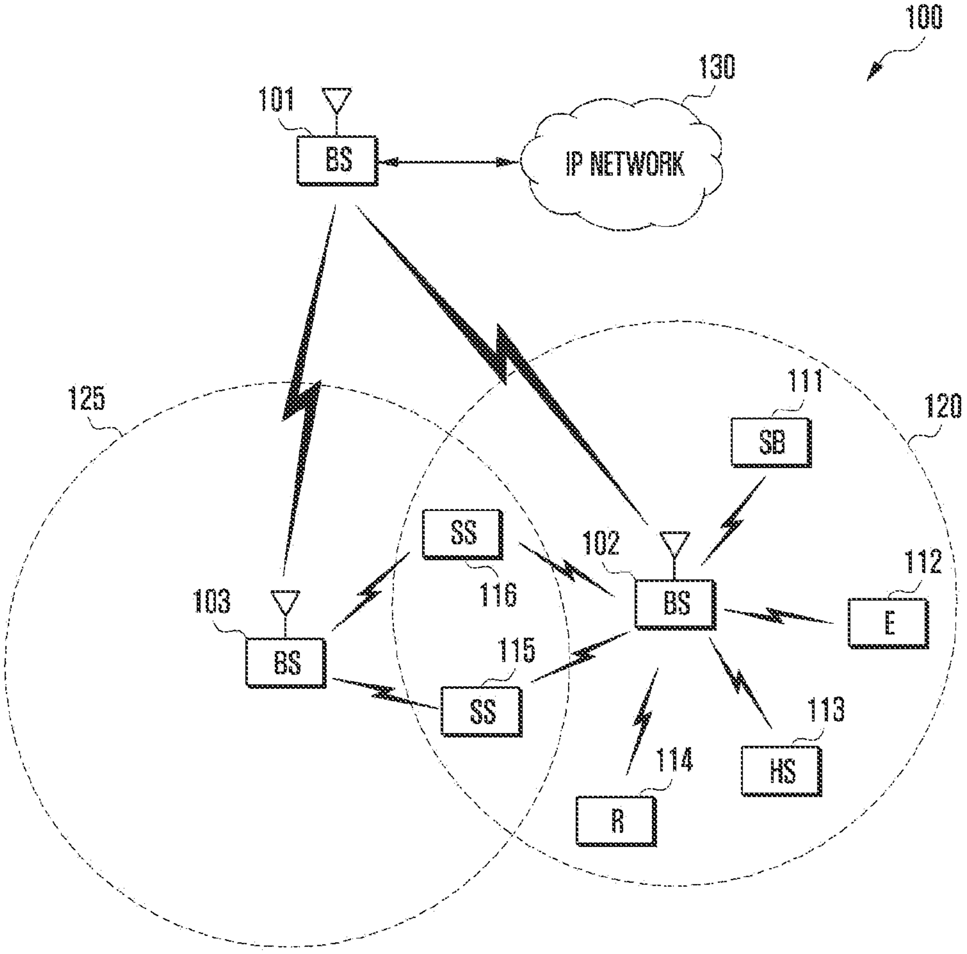
FIG. 1 illustrates an example wireless network according to an embodiment of the present disclosure.

FIGS. 1 through 16, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

Embodiments of the disclosure are described with reference to the accompanying drawings.

In describing embodiments, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly convey the main idea.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose and inform those skilled in the art of the scope of the disclosure, and the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create a means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed concurrently or the blocks may sometimes be executed in the reverse order, depending upon the functionality involved.

As used herein, "unit" refers to a software element or a hardware element, such as a field programmable gate array (FPGA) or an application specific integrated circuit (ASIC), which performs a predetermined function. However, the term "unit" does not always have a meaning limited to software or hardware. "Unit" may be constructed either to be stored in an addressable storage medium or to execute one or more processors. Therefore, "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may either be combined into a smaller number of elements, or a "unit," or divided into a larger number of elements, or a "unit." Moreover, the elements and "units" may be implemented to reproduce one or more CPUs within a device or a security multimedia card. Further, the term "unit" in the embodiments may include one or more processors.

The text and figures are provided solely as examples to aid the reader in understanding the disclosure. They are not intended and are not to be construed as limiting the scope of the disclosure in any manner. Although certain embodiments and examples have been provided, it will be apparent to those skilled in the art based on the disclosures herein that changes in the embodiments and examples shown may be made without departing from the scope of the disclosure.

The flowcharts illustrate example methods that can be implemented in accordance with the principles of the disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for ireless data traffic having increased since deployment of 4G communication systems, and to enable various vertical applications, 5G communication systems have been developed and are currently being deployed.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G communication systems, development for system network improvement is cinder way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like, FIG. 1 illustrates an example wireless network 100 according to an embodiment of the present disclosure.

The embodiment of the wireless network 100 shown in FIG. 1 is for illustration only. Other embodiments of the wireless network 100 may be used without departing from the scope of the disclosure.

The wireless network 100 includes a gNodeB (gNB) 101, a gNB 102, and a gNB 103. The gNB 101 communicates with the gNB 102 and the gNB 103. The gNB 101 also communicates with at least one internet protocol (IP) network 130, such as the internet, a proprietary IP network, or other data network.

Depending on the network type, the term "gNB" may refer to any component (or collection of components) configured to provide remote terminals with wireless access to a network, such as a base station (BS), a base transceiver station, a radio base station, transmit point (TP), transmit-receive point (TRP), a ground gateway, an airborne gNB, a satellite system, mobile base station, a macrocell, a femtocell, a WiFi access point (AP) and the like. Also, depending on the network type, other well-known terms may be used instead of “user equipment” or “UE,” such as “terminal,” “mobile station,” “subscriber station,” “remote terminal,” “wireless terminal,” or “user device.” For the sake of convenience, the terms “user equipment” and “UE” are used in this patent document to refer to equipment that wirelessly accesses a gNB. The UE could be a mobile device or a stationary device. For example, UE could be a mobile telephone, smartphone, monitoring device, alarm device, fleet management device, asset tracking device, automobile, desktop computer, entertainment device, infotainment device, vending machine, electricity meter, water meter, gas meter, security device, sensor device, appliance etc.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, Which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include two-dimensional (2D) antenna arrays as described in embodiments of the present disclosure. In some embodiments, one or more of gNB 101, gNB 102 and gNB 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
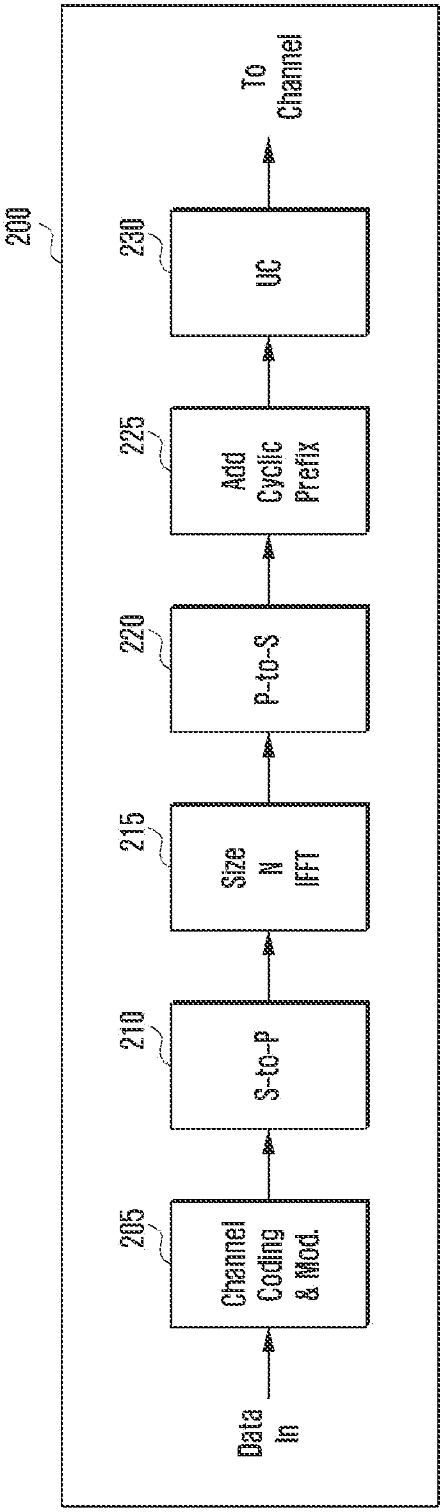
FIG. 2A illustrates an example wireless transmit path according to an embodiment of the present disclosure.
Figure 2B:
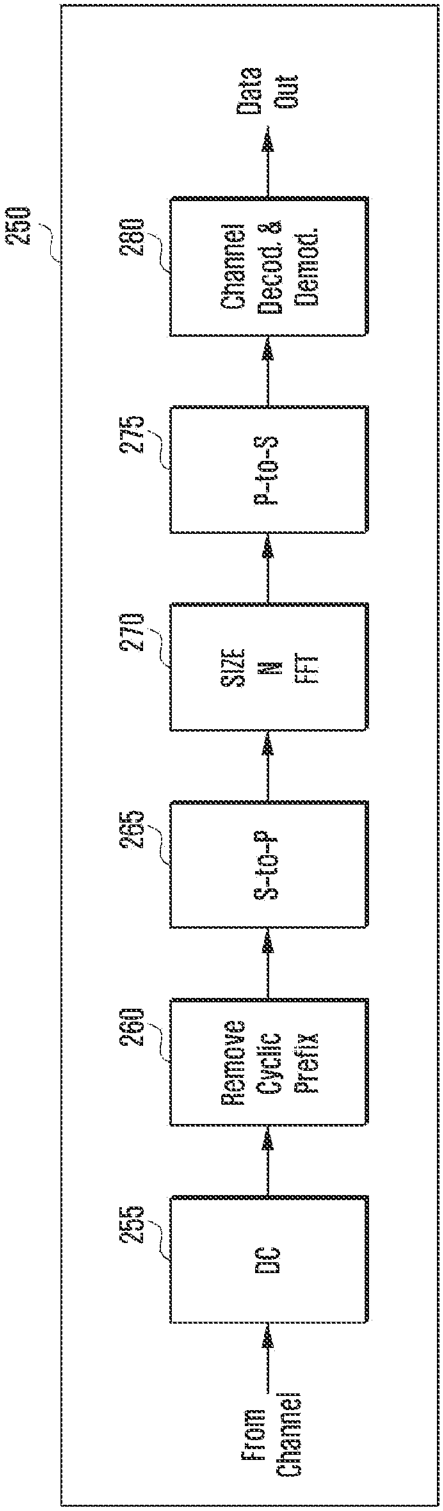
FIG. 2B illustrates an example wireless receive path according to an embodiment of the present disclosure.

FIG. 2A illustrates an example wireless transmit path according to an embodiment of the present disclosure. FIG. 2B illustrates an example wireless receive path according to an embodiment of the disclosure.

In the following description, a transmit path 200 may be described as being implemented in a gNB (such as gNB 102), while a receive path 250 may be described as being implemented in a UE (such as UE 116). However, it will be understood that the receive path 250 may be implemented in a gNB and that the transmit path 200 may be implemented in a UE. In some embodiments, the receive path 250 may be configured to support the codebook design and structure for systems having 2D) antenna arrays as described in embodiments of the disclosure.

Referring to FIG. 2A, the transmit path 200 includes a channel coding and modulation block 205, a serial-to-parallel (S-to-P) block 210, a size N inverse fast Fourier transform (IFFT) block 215, a parallel-to-serial (P-to-S) block 220, an add cyclic prefix block 225, and an up-converter (UC) 230. Referring to FIG. 2B, the receive path 250 includes a down-converter (DC) 255, a remove cyclic prefix block 260, a serial-to-parallel (S-to-P) block 265, a size N fast Fourier transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix (CP) to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink (DL) to UEs 111-116 and may implement a receive path 250 that is analogous to receiving in the uplink (UL) from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of the disclosure. Other types of transforms, such as discrete Fourier transform (DFT) and inverse discrete Fourier transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3A:
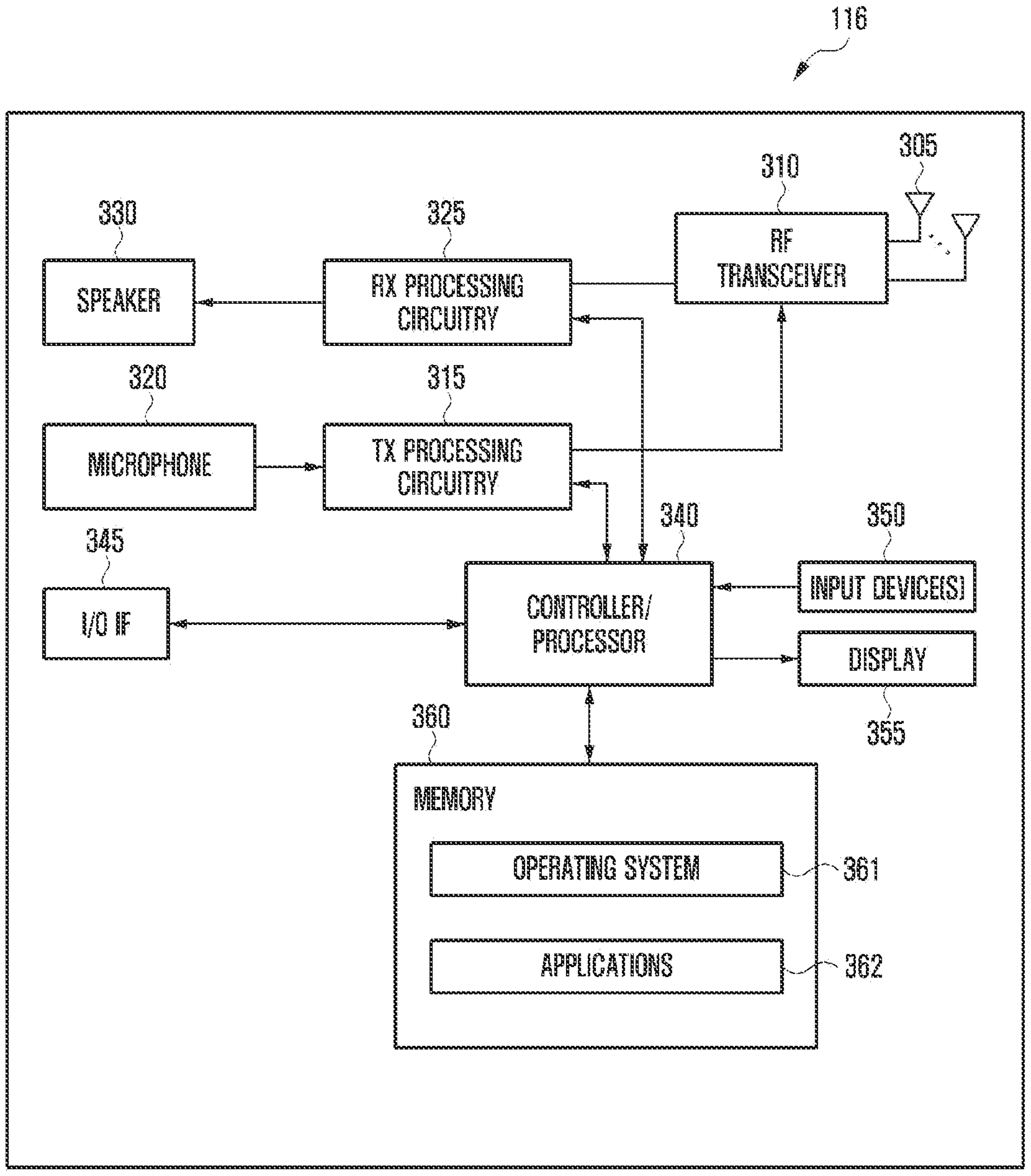
FIG. 3A illustrates an example UE according to an embodiment of the present disclosure.

FIG. 3A illustrates an example UE 116 according to an embodiment of the present disclosure.

The embodiment of the UE 116 illustrated in FIG. 3A is for illustration only, and the UEs 111-115 of FIG. 1 may have the same or similar configuration. However, UEs come in a wide variety of configurations, and FIG. 3A does not limit the scope of the disclosure to any particular implementation of a UE.

Referring to FIG. 3A, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 can control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites. The memory 360 is coupled to the main processor 340. Part of the memory 360 can include a random access memory (RAM), and another part of the memory 360 can include a Flash memory or other read-only memory (ROM).

Although FIG. 3A illustrates one example of UE 116, various changes may be made to FIG. 3A. For example, various components in FIG. 3A can be combined, further subdivided, or omitted and additional components can be added according to particular needs. As a particular example, the main processor 340 can be divided into multiple processors, such as one or more central processing units (CPUs) and one or more graphics processing units (GPUs). Also, while FIG. 3A illustrates the UE 116 configured as a mobile telephone or smartphone, UEs can be configured to operate as other types of mobile or stationary devices.

Figure 3B:
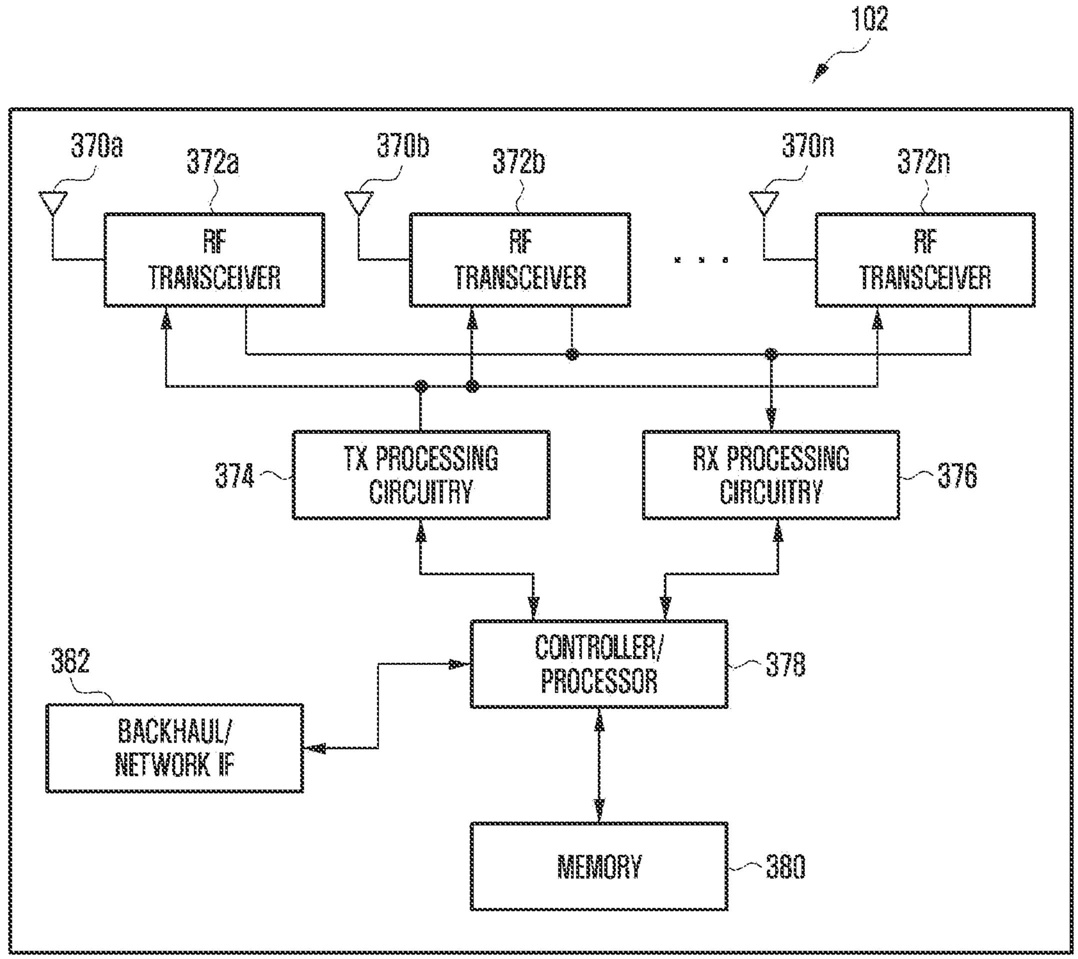
FIG. 3B illustrates an example gNB according to an embodiment of the present disclosure.

FIG. 3B illustrates an example gNB 102 according to an embodiment of the present disclosure.

The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the disclosure to any particular implementation of a gNB. It is noted that gNB 101 and gNB 103 can include the same or similar structure as gNB 102.

Referring to FIG. 3B, the gNB 102 includes multiple antennas 370*a*-370*n*, multiple RF transceivers 372*a*-372*n*, transmit (TX) processing circuitry 374, and receive (RX) processing circuitry 376. In certain embodiments, one or more of the multiple antennas 370*a*-370*n* include 2D antenna arrays. The gNB 102 also includes a controller/processor 378, a memory 380, and a backhaul or network interface 382.

The RF transceivers 372*a*-372*n* receive, from the antennas 370*a*-370*n*, incoming RF signals, such as signals transmitted by UEs or other gNBs. The RF transceivers 372*a*-

372*n* down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372*a*-372*n* receive the outgoing processed baseband or IF signals from the TX processing circuitry 374 and up-converts the baseband or IF signals to RF signals that are transmitted via the antennas 370*a*-370*n*.

The controller/processor 378 can dude one or more processors or other processing devices that control the overall operation of the gNB 102. For example, the controller/processor 378 can control the reception of forward channel signals and the transmission of reverse channel signals by the RF transceivers 372*a*-372*n*, the RX processing circuitry 376, and the TX processing circuitry 374 in accordance with well-known principles. The controller/processor 378 can support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions can be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web real time communication (RTC). The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection over a network. The interface 382 can support communications over any suitable wired or wireless connection(s). For example, when the gNB 102 is implemented as part of a cellular communication system (such as one supporting 5G, LTE, or LTE-A), the interface 382 can allow the gNB 102 to communicate with other gNBs over a wired or wireless backhaul connection. When the gNB 102 is implemented as an access point, the interface 382 can allow the gNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 can include a RAM, and another part of the memory 380 can include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372*a*-372*n*, TX processing circuitry 374, and/or RX processing circuitry 376) support communication with aggregation of frequency division duplexing (FDD) cells and time division duplexing (TDD) cells.

Although FIG. 3B illustrates one example of an gNB 102, various changes may be made to FIG. 3B. For example, the gNB 102 can include any number of each component shown in FIG. 3B. As a particular example, an access point can include a number of interfaces 382, and the controller/processor 378 can support routing functions to route data between different network addresses. As another particular example, while shown as including a single instance of TX processing circuitry 374 and a single instance of RX processing circuitry 376, the gNB 102 can include multiple instances of each (such as one per RF transceiver).

Multiple input multiple output (MIMO) system wherein a BS and/or a UE is equipped with multiple antennas has been widely employed in wireless systems for its advantages in terms of spatial multiplexing, diversity gain and array gain.

Figure 4:
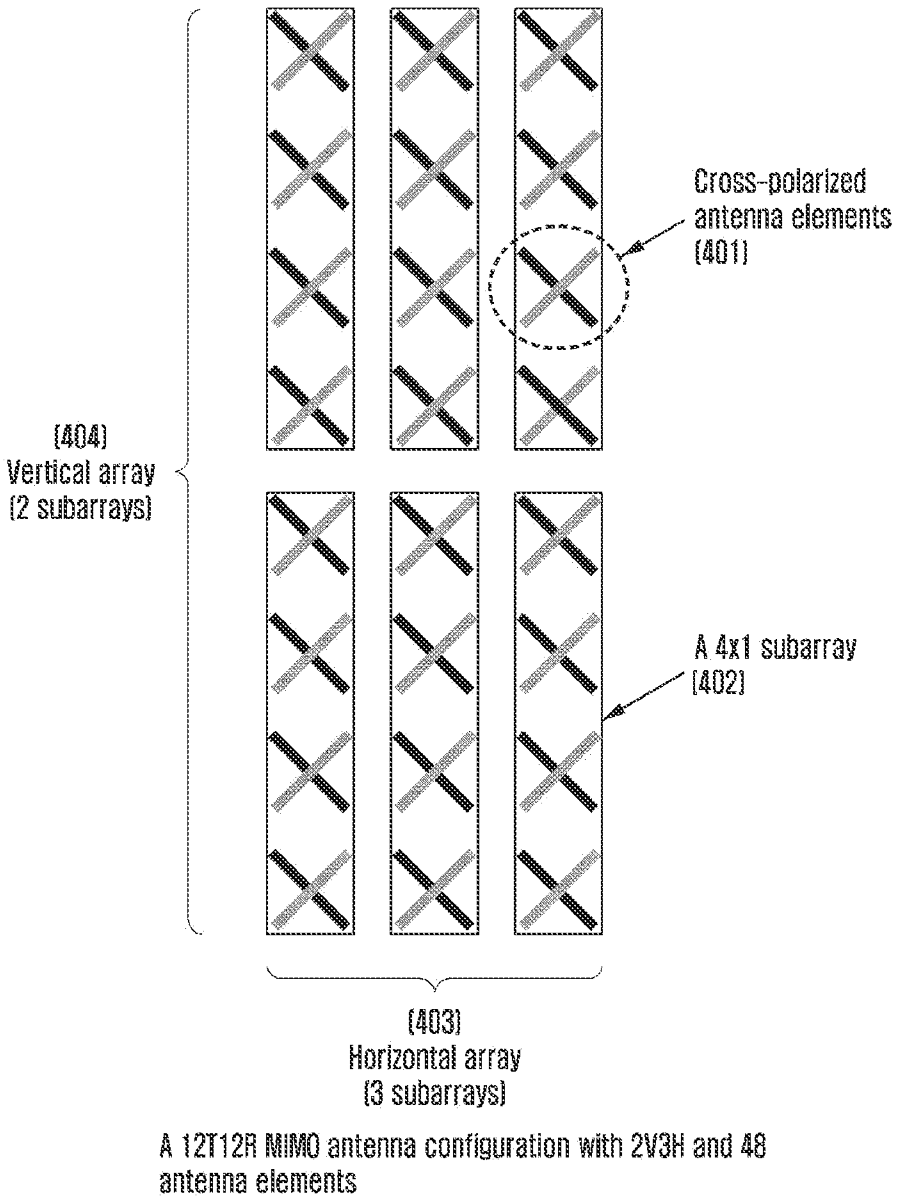
FIG. 4 illustrates an exemplary cross-polarized MIMO antenna system according to an embodiment of the present disclosure.

FIG. 4 illustrates an exemplary cross-polarized MIMO antenna system according to an embodiment of the present disclosure.

FIG. 4 illustrates an example of MIMO antenna configuration with 48 antenna elements.

Referring to FIG. 4, 4 cross-polarized 401 antenna elements form a 4×1 subarray 402. 12 subarrays form a 2 in vertical dimension and 3 in horizontal dimension (2V3H) MIMO antennas configuration consisting 2 subarrays 404 in vertical dimension and 3 subarrays 403 in horizontal dimension, respectively. Although FIG. 4 illustrates one example of MIMO antenna configuration, the disclosure may be applied to various such configurations.

In MIMO systems, the channel state information (CSI) is required at the base station (BS) so that a signal from the BS is received at the UE with maximum possible received power and minimum possible interference. The acquisition of CSI at the BS may be via a measurement at the BS from an uplink (UP reference signal (RS) or via a measurement and feedback by the UE from a downlink (DL) reference signal for TDD and FDD systems, respectively. In 5G FDD systems, the channel state information reference signal (CSI-RS) is the primary reference signal that is used by the UE to measure and report CSI.

In some embodiments, a UE may receive a configuration signaling from a BS for a CSI-RS that can be used for channel measurement. An example of such configuration is illustrated in FIG. 5.

Figure 5:
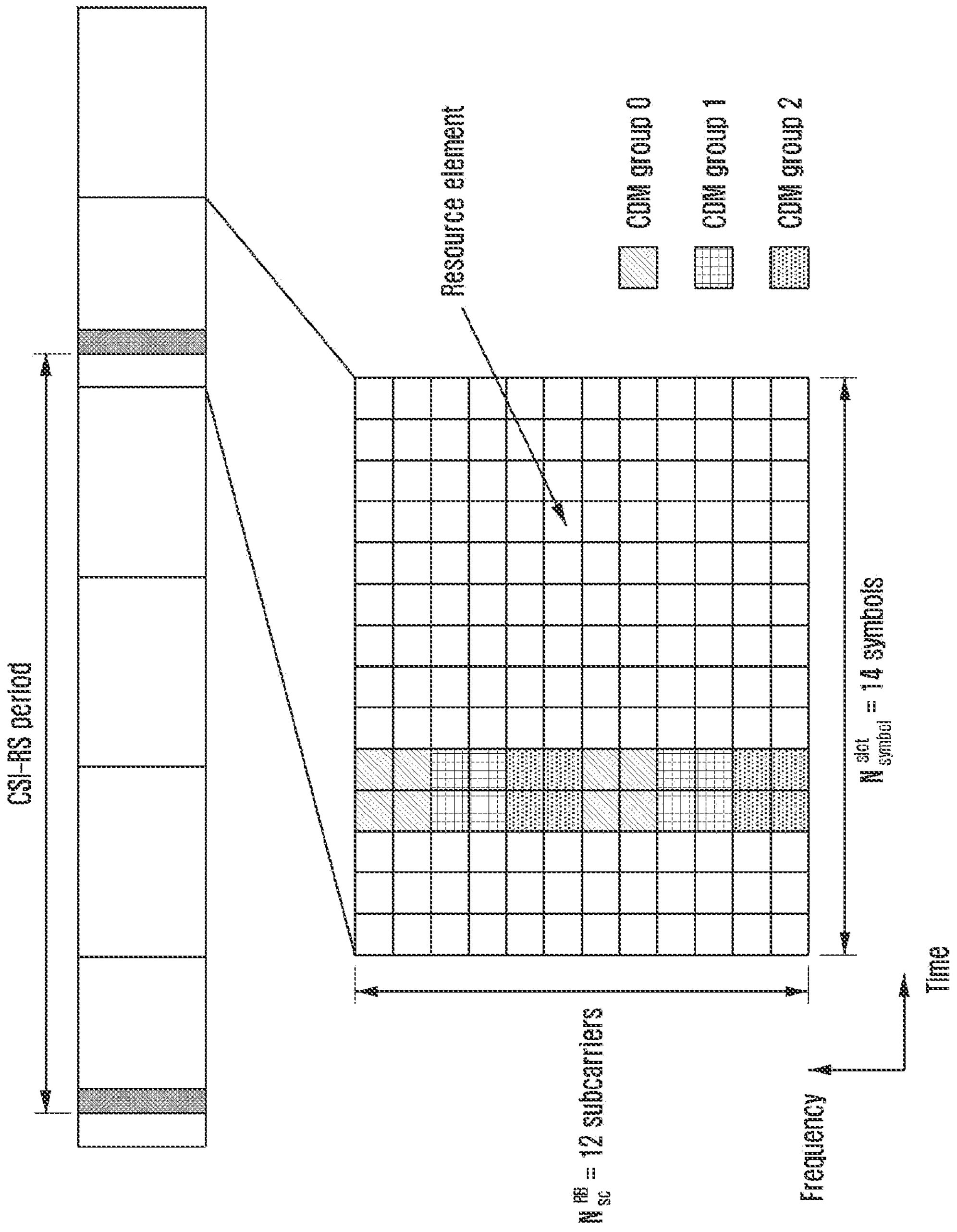
FIG. 5 illustrates a layout for CSI-RS resource mapping in an orthogonal frequency division multiplexing (OFDM) time-frequency grid, according to an embodiment of the present disclosure.

FIG. 5 illustrates a layout for CSI-RS resource mapping in an OFDM time-frequency grid according to an embodiment of the present disclosure.

Referring to FIG. 5, 12 antenna ports (CSI-RS ports) are mapped to a CSI-RS with 3 code-division multiplexing (CDM) groups (e.g., CDM group 0, CDM group 1, CDM group 2), wherein each CDM group is mapped to 4 resource elements (REs) in OFDM time-frequency grid. The antenna ports that are mapped to the same CDM group can be orthogonalized in code-domain by employing orthogonal cover codes. The CSI-RS configuration in FIG. 5 can be related to the MIMO antenna configuration in FIG. 4, by mapping a CSI-RS port to one of the polarization of a subarray. In the 5G NR standards, three time-domain CSI-RS resources configurations, namely: periodic, semi-persistent and aperiodic are possible. In FIG. 5, an illustrative example of periodic configuration is given with a period of 4 slots.

In some embodiments, the BS is capable of configuring a UE, by a higher layer signaling, with information for a CSI feedback that may include spatial channel information indicator and other supplementary information that may help the BS to have an accurate CSI. The spatial channel indicator, which is reported via a precoding matrix indicator (PMI) in 4G and 5G specifications, comprises a single or a plurality of channel matrix, the channel covariance matrix, the eigenvectors, or spatial sampling basis vectors. In particular, in 4G and 5G specification, the spatial channel information can be given by a single or a plurality of discrete Fourier transform (DFT) basis vectors.

Figure 6:
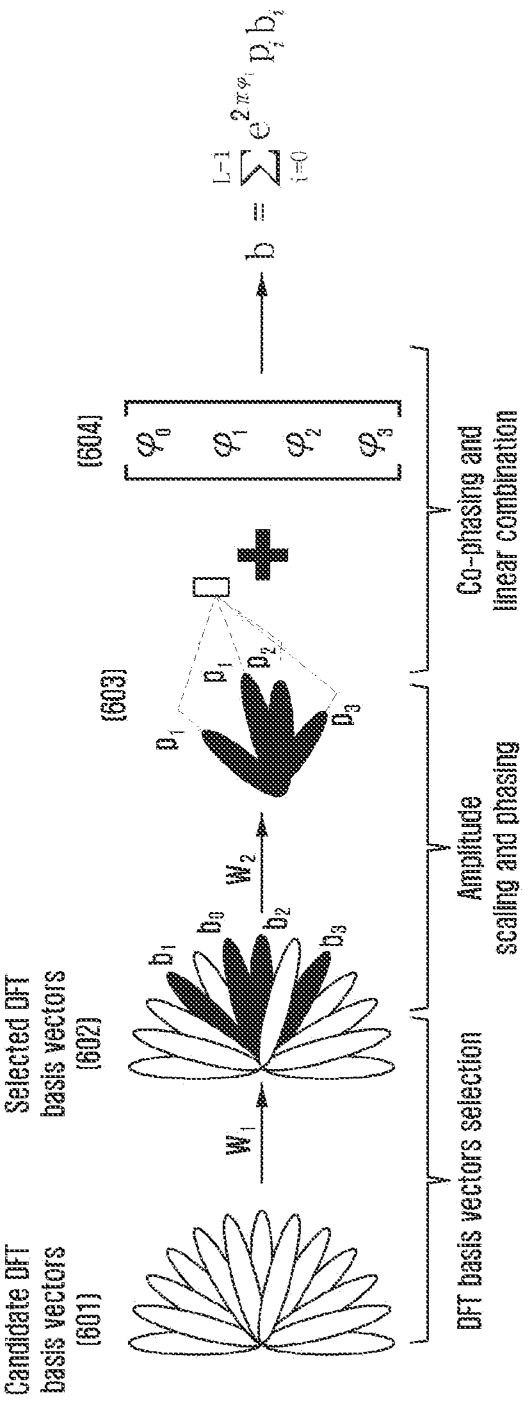
FIG. 6 illustrates an example of precoder construction for Type II CSI according to an embodiment of the present disclosure.

FIG. 6 illustrates an example of precoder construction for Type II CSI according to an embodiment of the present disclosure. FIG. 6 illustrates an example of CSI feedback based on a plurality of DFT basis vectors for what is known as Type II CSI in 5G NR.

Referring to FIG. 6, the spatial information of the channel is reported in terms of L=4 DFT basis vectors ($b_0,b_1,b_2,b_3$) 602 from a set of candidate DFT basis vectors 601. Additionally, amplitude information $\{p_0,p_1,p_2,p_3\}$ 603 and co-phasing information $\{\varphi_0,\varphi_1,\varphi_2,\varphi_3\}$ 604 are reported. Thus, in Type II CSI a dual-stage precoding matrix is given as $w=w_1w_2$, where $w_1$ select the DFT basis vectors and $w_2$ assign amplitude and co-phasing coefficients. Furthermore, a codebook can be defined as superset of candidate DFT basis vectors as well as candidate amplitude and phase coefficients. Then, a reported PMI may include indicators to the elements of a codebook that can represent the estimated channel.

In one embodiment, amplitude and phase information are reported in such a way that the linear combination of the basis vectors, i.e., $$b=\sum_{i=0}^{L-1} e^{2\pi\varphi_i} p_i b_i,$$

is matched to the eigenvector direction of the channel. Specifically, for a channel matrix H with the (s,u)-th element $h_{s,u}$ representing the channel gain between the s-th transmit and the u-th receive antenna, the eigenvectors of the covariance matrix $H^H H$ can be considered. Let $e_l$ denote one of the eigenvectors, then the PMI can be selected by the UE in such a way that the value $\|e_l^H b\|$ is maximized.

Moreover, a UE may be configured in different ways to report a tuple of DFT basis vectors, amplitude coefficients and the phase coefficients, based on polarization-common or polarization-specific manner. For example, in 5G NR specifications, DFT basis vectors are reported in a polarization-common manner while phase and amplitude coefficients are reported in polarization specific manner, i.e., reported per polarization. MIMO systems allow spatial multiplexing, i.e., transmission of data in multiple transmission layers. In this regard, the type II CSI in the 5G NR allows the DFT basis vectors to be reported in a layer-common manner, i.e., common basis for all layers, while phase and amplitude coefficients to be reported in a layer-specific manner.

In order to account for the frequency-selectivity of a wideband channel, some embodiments allow various components of the precoding matrix, i.e., components of PMI, to be reported per frequency ranges. In some configurations, the frequency band the UE is configured for CSI reporting is partitioned into a set of subbands and the amplitude and/or phases coefficients are reported per a subband manner.

Figure 7A:
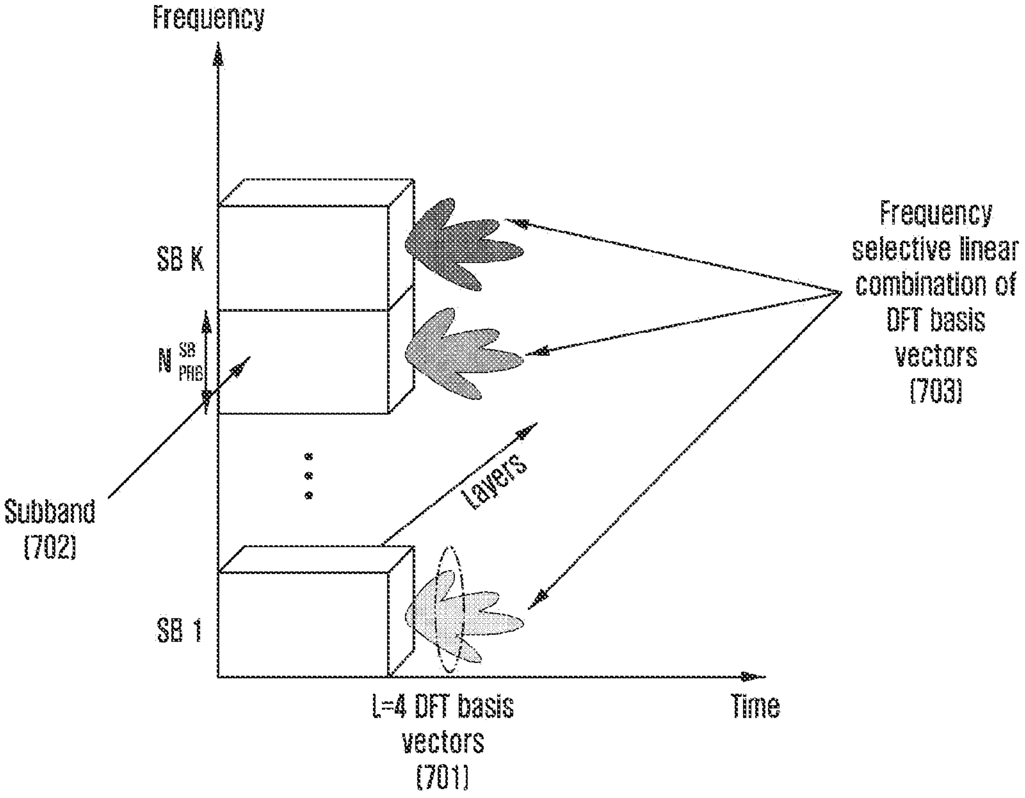
FIG. 7A illustrates exemplary reporting precoding matrices in subband granularity according to an embodiment of the present disclosure.

FIG. 7A illustrates exemplary reporting precoding matrices in subband granularity according to an embodiment of the present disclosure.

Referring to FIG. 7A, the DL BWP can be partitioned in to subbands with subband size $$N_{PRB}^{SB}$$

physical resource blocks (PRBs) 702. Then the selected DFT basis vectors 701 are linearly combined with different weights so that the resulting vector is aligned to the eigenvector of the channel in that subband. Denoting the set of subcarriers in the k-th subband as $F_k$, then the eigenvectors of the averaged covariance matrix $$C_k=\frac{1}{|F_k|}=\sum_{f\in F_k}\left((H_{f,k})^H(H_{f,k})\right)$$

can be considered, where, $f\in F_k$ are subcarriers in the k-th subband and $H_{f,k}$ is the corresponding channel matrix.

FIG. 7A illustrates an example for frequency selective linear combination of DFT basis vectors 703 for K subbands of size $$N_{PRB}^{SB}$$

702.

In 5G NR specifications, another configuration, known as enhanced Type II (eType II) CSI, allows reporting amplitude and phase coefficients in a delay-domain rather than per subband reporting in frequency-domain. This configuration reduces the feedback overhead as the delay components are usually much smaller than the equivalent number of subbands. In enhanced Type II codebook (eType II CB) (FIG. 7B), precoding matrices are reported in delay domain by employing frequency-domain (FD) DFT basis rather than the frequency domain reporting in Type II CSI (FIG. 7A), i.e., per subband or wideband.

Figure 7B:
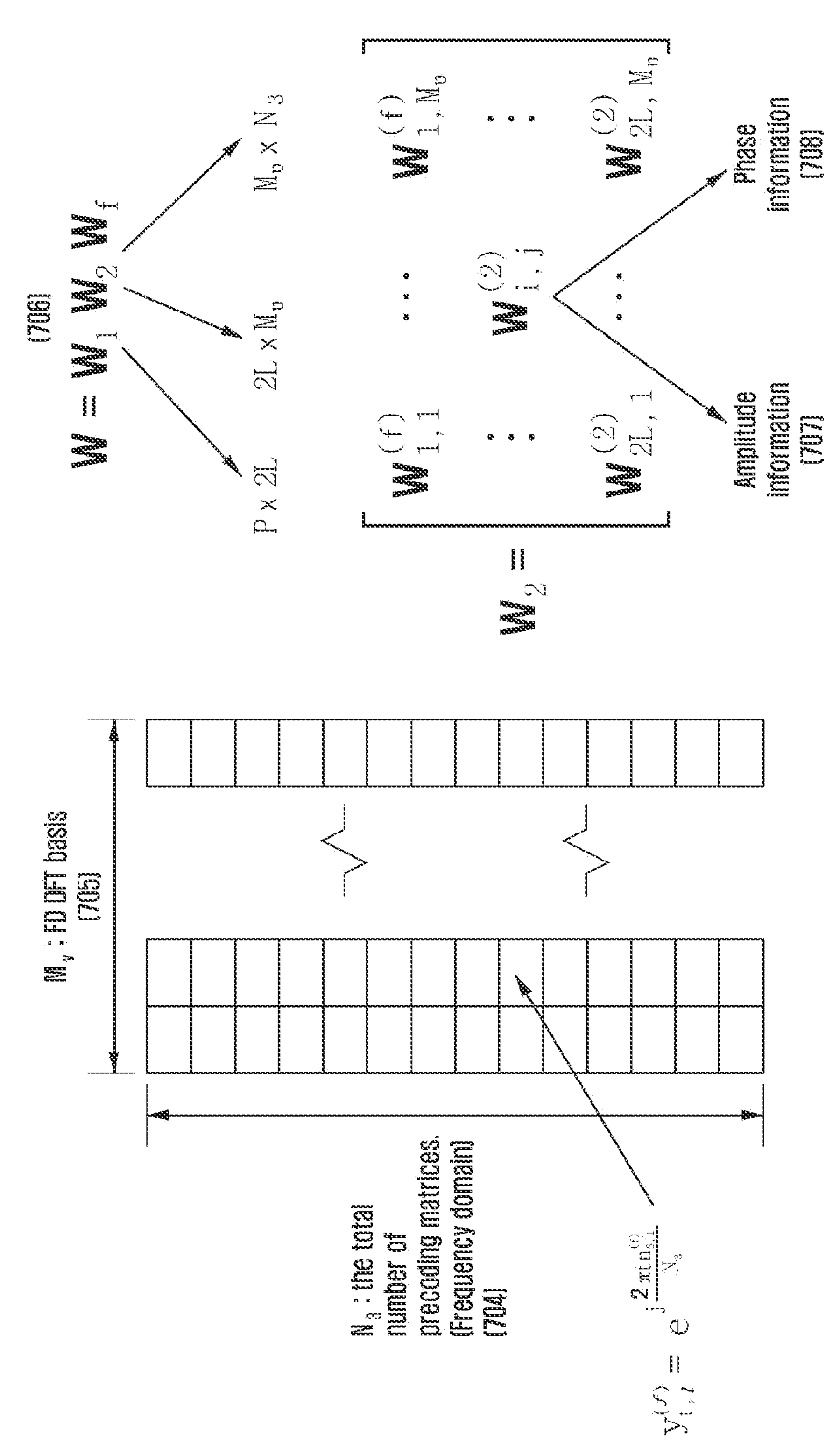
FIG. 7B illustrates an exemplary precoding matrix construction for enhanced Type II CSI according to an embodiment of the present disclosure.

FIG. 7B illustrates an exemplary precoding matrix construction of eType II CSI according to an embodiment of the present disclosure.

Referring to FIG. 7B, a precoding matrix is expressed in three-stages $$w=w_1 w_2 w_f^H$$

706. The spatial domain selection matrix $w_1$ selects L DFT vectors from $P=2N_1N_2$ CSI-RS ports, consequently, it has 2 L rows accounting for the cross-polarized antennas. Moreover, an $M_v \times N_3$ matrix $$w_f^H$$

corresponds to $M_v$ DFT basis vectors 705 that may transform the precoding matrix reported in delay domain for $M_v$ delay components to a frequency domain with $N_3$ frequency domain points (bins) 704. In particular, the $t \in \{1, 2, \ldots, N_3\}$-th element of f-th vector is given by $$y_{t,l}^{(f)} e^{j\frac{2\pi t n_{3,l}^{(f)}}{N_3}}.$$

Finally, the matrix $w_2$ carries the amplitude and phase information wherein the i-th and j-th element, $w_{i,j}$, carries amplitude 707 and phase 708 information of i-th 2D DFT beam and j-th delay component.

In order to further reduce the CSI overhead, a system may exploit angle-delay reciprocity and measure the dominant angle and delay components of a channel from an UL reference signal such as sounding reference signal (SRS). Then, a precoded CSI-RS can be considered for DL CSI measurement wherein the CSI-RS ports are mapped to an angle-delay component of the channel. Moreover, delay pre-compensation can be applied to the CSI ports so that the UE may measure CSI for a fewer number of delay components, i.e., in the extreme case for just one delay component.

Recently, artificial intelligence (AI)-based CSI feedback has gained considerable attention.

Figure 8:
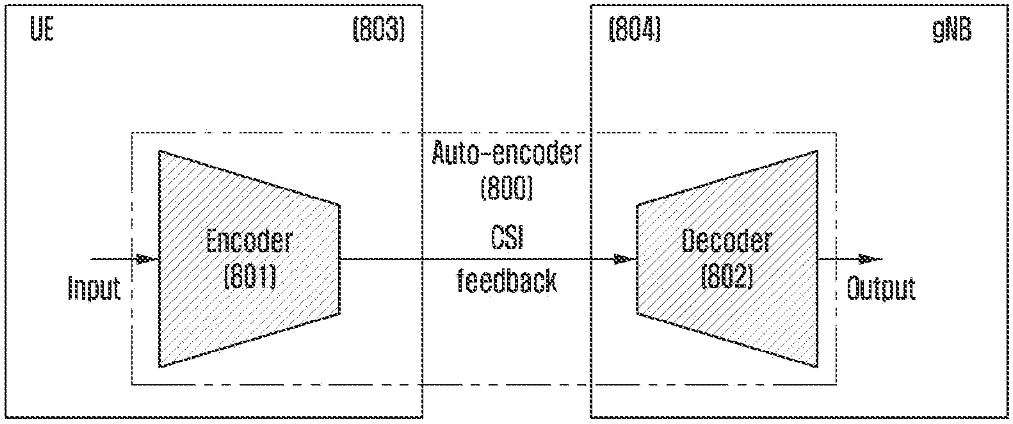
FIG. 8 illustrates an auto-encoder based CSI feedback according to an embodiment of the present disclosure.

FIG. 8 illustrates an auto-encoder based CSI feedback according to an embodiment of the present disclosure.

Referring to FIG. 8, an auto-encoder (AE) may consist of an encoder part 801 at the UE 803 generating the CSI feedback and a decoder 802 at the gNB 804 reconstructing the CSI feedback. The main aim of an AE-based CSI feedback is to find the best representation of a channel state information in terms of feedback overhead. In another words, AE compresses the CSI to reduce the CSI feedback overhead.

The input for an auto-encoder can take different formats. In one embodiment, the input may be the eigenvectors of the channel. The covariance matrix of an $N_t \times N_r$ channel matrix H given as $H^H H$ can be computed by the UE. Then, the dominant eigenvectors of the covariance matrix $\mathrm{eig}(H^H H) = V\Sigma\Lambda$ given as $v = [v_1 \ldots v_r]$ may be considered as an input for the auto-encoder.

Figure 9:
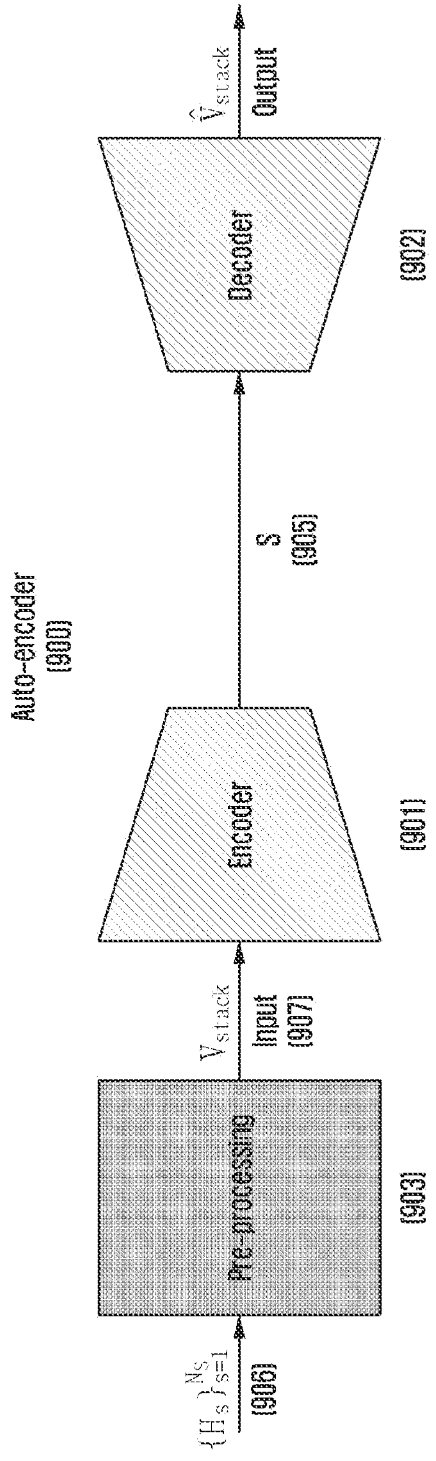
FIG. 9 illustrates an example of an auto-encoder based CSI feedback wherein a preprocessing unit transforms the estimated channel to stacked eigenvectors according to an embodiment of the present disclosure.

FIG. 9 illustrates an example of an auto-encoder based CSI feedback wherein a preprocessing unit transforms the estimated channel to stacked eigenvectors according to an embodiment of the present disclosure.

Referring to FIG. 9, a set of $N_s$ channel matrices which belong to $N_s$ subbands, i.e., $$\{H_s\}_{s=1}^{N_s},$$

is input 906 for a pre-processing unit 903. The pre-processing unit may compute the $N_s$ eigenvectors and stack them as a column of a matrix $V_{stack}$. An encoder 901 takes the column of the matrix $V_{stack}$ as an input 907 and then generates a CSI feedback in terms of a bit stream s 905. The decoder 902, that is part of the auto-encoder 900, takes the CSI feedback and reconstructs the stacked eigenvectors. Moreover, a gNB then may use the reconstructed stacked eigenvectors $\hat{V}_{stack}$ as precoders.

Codebook subset restriction (CBSR) is used by gNB to configure CSI reporting by making into account interference. One aspect is managing inter-cell interference (ICI) as shown in FIG. 10.

Figure 10:
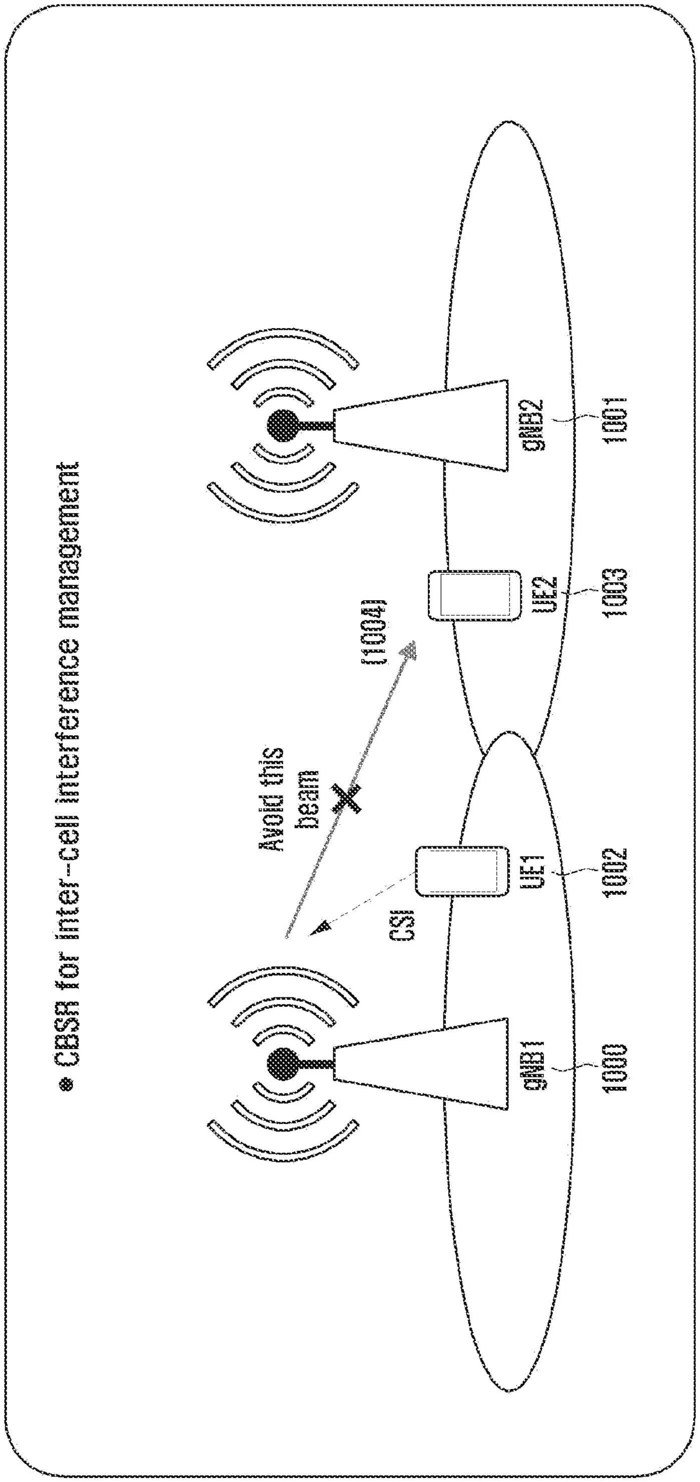
FIG. 10 illustrates an exemplary use case of CBSR for inter-cell interference management among neighboring cells according to an embodiment of the present disclosure.

FIG. 10 illustrates an exemplary use case of CBSR for inter-cell interference management among neighboring cells according to an embodiment of the disclosure.

Referring to FIG. 10, a serving cell gNB 1000 is configuring UE1 1002 for reporting CSI 1002. If a UE or another gNB 1001 in the neighboring cell, e.g., UE2 1003 is strongly affected by inter-cell interference when a certain beam 1004 is used, then gNB1 can configure UE1 not to report CSI corresponding to that beam (direction).

Another use-case for CBSR is CSI reporting configuration for co-scheduled UEs.

Figure 11:
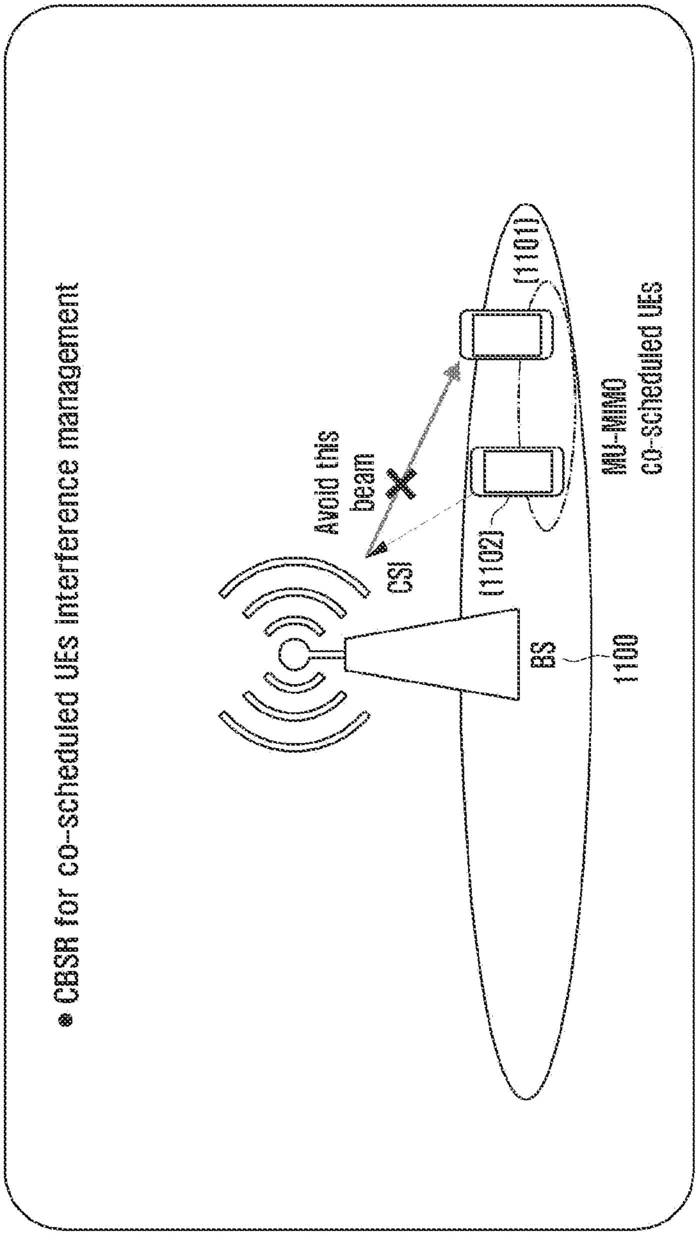
FIG. 11 illustrates an exemplary use case of CBSR for inter-UE interference management for co-scheduled UEs according to an embodiment of the present disclosure.

FIG. 11 illustrates an exemplary use case of CBSR for inter-UE interference management for co-scheduled UEs according to an embodiment of the present disclosure.

Referring to FIG. 11, a gNB 1100 may configure CSI reporting to the UE 1101 while considering interference to a potential co-scheduled UE 1102. In this case, the CSI configuration may include CBSR to avoid either a certain set of codewords of a codebook or beam 1103 (transmission direction).

In 5G NR, CBSR is configured in different ways for type I and type II CSI.

Figure 12:
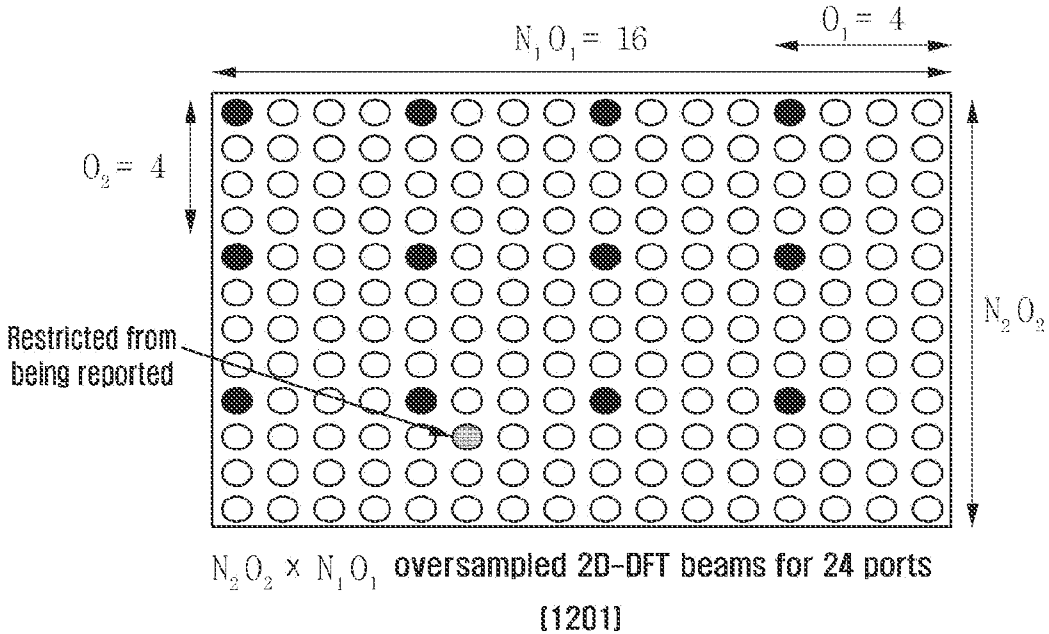
FIG. 12 illustrates exemplary CBSR configurations for Type I and Type II CSI according to an embodiment of the present disclosure.
Figure 12:
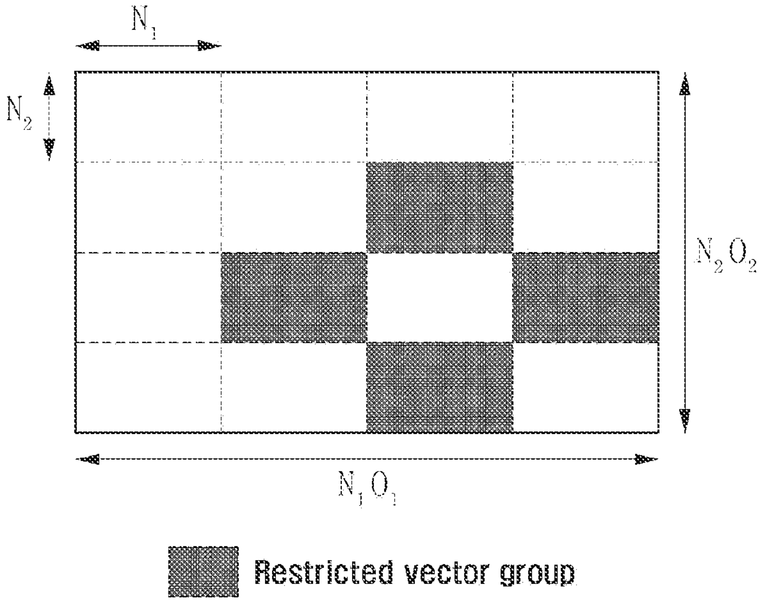

FIG. 12 illustrates exemplary CBSR configurations for Type I and Type II CSI according to an embodiment of the present disclosure.

Referring to reference numeral 1201 of FIG. 12, in Rel-15 Type I CSI, a CBSR is configured by a bitmap vector which restricts some of the 2D-DFT beams. An example configuration may be a bitmap vector of length $N_1O_1N_2O_2$ for an antenna panel configuration with $N_1$ and $N_2$ ports in each dimension with the corresponding 2D-DFT oversampling factor $O_1$ and $O_2$, respectively.

Another way for CBSR configuration was introduced for Type II CSI. Referring to reference numeral 1202 of FIG. 12, in Type II CSI, the $N_1O_1N_2O_2$ 2D-DFT beams are grouped into $O_1O_2$ vector groups each with size of $N_1N_2$. Then the gNB may indicate a certain set of these vector groups to be restricted from reporting via CBSR. Moreover, based on UE's reported capability, a CBSR may include maximum amplitude coefficient for each vector group. As an example, Table 1 shows the maximum amplitude coefficients mapping with CBSR bits for the vector groups restricted by CBSR. In particular, the CBSR configuration is indicated by bits sequence with two parts given as $B=B_1B_2$. Then, the first part $B_1$ indicates the restricted vector groups and the second part $B_2$ indicates the maximum amplitude coefficient in Table 1. The maximum amplitude coefficient configurations indicated by bits "01" and "10" are subject to UE's reported capability.

TABLE 1

| Bits | Maximum Amplitude Coefficient |
|---|---|
| 00 | 0 |
| 01 | 1/2 |
| 10 | $\sqrt{1/2}$ |
| 11 | 1 |

In order to enhance the UE throughput, especially for cell-edge UEs, coherent joint transmission (CJT) among geographically distributed TRPs can be considered.

Figure 13:
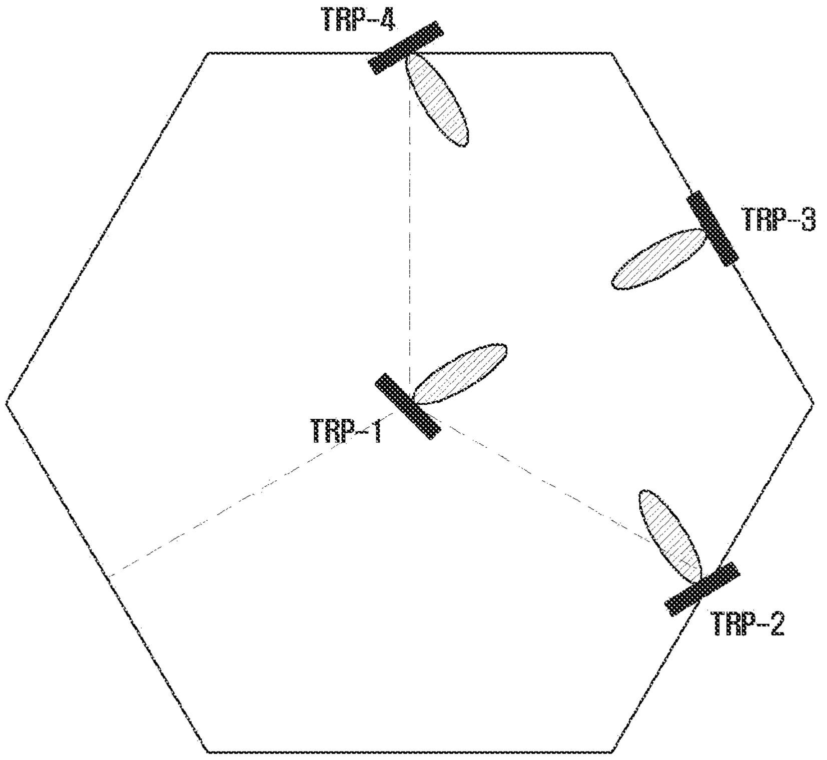
FIG. 13 illustrates an exemplary a layout for coherent joint transmission from multiple TRPs according to an embodiment of the present disclosure.

FIG. 13 illustrates an exemplary a layout for CJT from multiple TRPs according to an embodiment of the present disclosure.

In this case the UE measures CSI corresponding to the multiple TRPs. One way of configuring such measurement is by assigning a CSI-RS resource to each TRP. Another way of configuration is to assign a single CSI-RS resource across the TRPs wherein a group of ports are associated to each TRP. Moreover, different codebook structures can be considered for CJT CSI. One structure may allow the UE to report co-amplitude and co-phasing coefficients. As an example, for Rel-16 and Rel-17 codebooks with the structure $$w = w_1 w_2 w_f^H,$$

the CSI for N TRPs can be constructed as equation 1:

$$\begin{bmatrix} (a_1 p_1) W_{1,1} W_{2,1} W_{f,1}^H \\ \vdots \\ (a_N p_N) W_{1,N} W_{2,N} W_{f,N}^H \end{bmatrix}. \quad \text{[Equation 1]}$$

where $a_r$ and $p_r$ are co-amplitude and co-phase coefficients for the r∈{1, . . . , N} TRP which ensure precise phasing for coherent transmission. In this structure, the spatial domain (SD) matrices ($w_{1,r}$), the frequency-domain (FD) matrices $$(w_{f,r}^H)$$

and the linear combining (LC) coefficients matrices ($w_{2,r}$) are reported independently per each TRP. Then the co-amplitude and co-phasing coefficients $a_r$ and $p_r$ play the combining role.

A yet another alternative structure is given as equation 2:

$$\begin{bmatrix} W_{1,1} & \ldots & 0 \\ \vdots & \ddots & \vdots \\ 0 & \ldots & W_{N,N} \end{bmatrix} W_2 W_f^H. \quad \text{[Equation 2]}$$

wherein the SD basis vector matrices $w_{1,1}, \ldots, w_{N,N}$ are reported per TRP while the (LC) matrix ($w_2$) and the FD basis matrix $$(W_f^H)$$

are reported across the TRPs.

Another consideration is CSI for high/medium velocities. One can extend the Type-II codebook to capture the time-domain correlation. One way of such extension is by considering a time-domain basis commonly selected for different SD/FD bases which can be written as $$(w_f^H \otimes w_1) w_2 w_t^H \text{ where } w_t^H$$

is a time-domain (TD) basis vector and $w_2$ is computed by considering SD, FD and TD basis vectors.

A yet another way to report CSI for time correlated channel is to report CSI in terms of Doppler-domain. One such formulation is given as $w_1 w_2 (w_f \otimes w_d)^H$ wherein $w_d$ is a Doppler-domain basis vector.

In the below various way of configurations for CBSR are provided for different use cases of CSI reporting.

In one embodiment, CBSR for CJT CSI is provided.

For CJT operations based on distributed TRPs, it is natural to consider per TRP CBSR configuration. In one aspect of the disclosure, Method 1-1 provides a way to configure CBSR per each TRP in the CJT measurement set. For example, N CBSR bit sequences $\{B_{11}B_{12}, B_{21}B_{22}, \ldots, B_{N1}B_{N2}\}$ are configured where the r-th bit sequence $B_{r1}B_{r2}$ represents the bit sequence for the r-th TRP. $B_{r1}$ selects the vector groups selected from reporting and $B_{r2}$ indicated the corresponding maximum amplitude coefficients. In one example, up to KTRP vector groups can be restricted per each TRP, i.e., $B_{r,1}$ for r∈{1, . . . , N} selects up to KTRP vector groups. In a yet another consideration, the maximum number for restricted vector groups given as K may be set across the TRPs. In this case, therefore, $$\sum_{r=1}^{N} K_r \leq K$$

is the number of vector groups that are restricted by CBSR, where $K_r$ is the number of vector groups restricted for r-th TRP.

In some cases, it may not be necessary for the gNB to configure CBSR for all the TRPs. As an examples some TRPs may be facing inwards to the serving cell rather than the neighboring cell while others are oriented in such a way that they incur strong interference to neighboring cells. In this case it is beneficial to configure CBSR for a subset of TRPs. As one aspect of the disclosure, Method. 1-2 provides a way to configure CBSR for a subset of TRPs in the CJT measurement set. One exemplary such configuration is given a three-parts bit sequence $B=B_0B_1B_2$ wherein $B_0$ selects the TRPs for the restricted vector groups, $B_1$ selects the restricted vector groups and $B_2$ sets the maximum amplitude coefficients. A UE may be configured with K vector groups indicated by $$(r_1^{(k)}, r_2^{(k)}) \text{ for } k = 0, 1, \ldots, K \text{ and } r_1^{(k)} \in \{0, 1, \ldots, O_1 - 1\}, r_2^{(k)} \in \{0, 1, \ldots, O_2 - 1\}.$$

In one exemplary embodiment, $B_0$ indicates the associated TRPs for the K vector groups. As an example, the bitwidth of $B_0$ can be set as $K\lceil \log_2(N) \rceil$ wherein each $\lceil \log_2(N) \rceil$ corresponding to the k∈{1, 2, . . . , K} restricted vector groups select one of the N TRPs in the measurement set.

In a yet another aspect of the disclosure, Method 1-3 provides a way to configure CBSR that can be applied across all the TRPs in the CJT measurement set. In this case, a single bit sequence with two parts $B_1B_2$ may be configured. The vector groups indicated by $B_1$ are restricted from CSI associated to all the TRPs in CJT measurement set. Similarly, the maximum amplitude coefficients indicated by $B_2$ apply to all TRPs across the CJT measurement set. This way the configuration overhead associated with CBSR can be reduced.

While indication of maximum amplitude coefficients for CBSR configuration for CJT, various considerations can be made.

In an embodiment the amplitude coefficients associated to a single TRP (r-th TRP) are summed across all the $M_v$ delay components. Additionally, the co-amplitude coefficient ($p_r$)

is additionally considered in the maximum amplitude coefficient restriction. An exemplary equation to express such restriction is given as equation 3:

$$\sqrt{\frac{1}{\sum_{f=0}^{M_v-1} k_{r,l,i+pL,f,d}^{(3)}} p_r \sum_{f=0}^{M_v-1} k_{r,l,i+pL,f}^{(3)} \left(p_{r,l,p}^{(1)} p_{r,l,i+pL,f}^{(2)}\right)^2} \leq \gamma_{i+pL}. \quad \text{[Equation 3]}$$

A table used in the legacy NR Rel-16 CSI (Table 2) can be reused.

Table 2 show an example of maximum allowed average coefficient amplitudes for restricted vectors.

TABLE 2

| Bit $b_2^{(k,2(N1x2+x1)+1)} b_2^{(k,2(N1x2+x1))}$ | Maximum Average Coefficient Amplitude $\gamma_{i+pL}$ |
|---|---|
| 00 | 0 |
| 01 | $\sqrt{1/4}$ |
| 10 | $\sqrt{1/2}$ |
| 11 | 1 |

In another embodiment, the maximum average amplitude coefficient indicated by $B_2$ may be calculate by averaging it across the N TRPs. In this case, the co-amplitude coefficients $p_r$ may be considered. Then, an exemplary equation to express such restriction is given as equation 4:

$$\sqrt{\frac{\frac{1}{\sum_{r=0}^{N-1} \sum_{f=0}^{M_v-1} k_{r,l,i+pL,f,d}^{(3)}}}{\sum_{r=0}^{N-1} p_r \sum_{f=0}^{M_v-i} k_{r,l,i+pL,f}^{(3)} \left(p_{r,l,p}^{(1)} p_{r,l,i+pL,f}^{(2)}\right)^2}} \leq \gamma_{i+pL}. \quad \text{[Equation 4]}$$

In one embodiment, CBSR for Time-correlated CSI is provided.

Another consideration is CBSR configuration for time-correlated CSI.

In this case, the maximum amplitude coefficient indicated by B2 may be calculated by averaging it across the Doppler/time-domain basis vectors. In this case, an exemplary equation to express such restriction is given as equation 5:

$$\sqrt{\frac{\frac{1}{\sum_{d=0}^{M_d-1} \sum_{f=0}^{M_v-1} k_{l,i+pL,f,d}^{(3)}} \sum_{d=0}^{M_d-1}}{\sum_{f=0}^{M_v-1} k_{l,i+pL,f,d}^{(3)} \left(p_{l,p}^{(1)} p_{l,i+pL,f,d}^{(2)}\right)^2}} \leq \gamma_{i+pL}. \quad \text{[Equation 5]}$$

Then, a table used in the legacy NR Rel-16 CSI (Table 2) can be reused.

In one embodiment, CBSR for AI-based CSI is provided.

Another aspect considered in the disclosure is an artificial intelligence based CSI. As an example, referring to an auto-encoder (AE) based CSI illustrated in FIG. 9, the encoder 901 compress the CSI to generate the latent-space representation (AI-based CSI), s 905, and the decoder 902 reconstructs the CSI. In this case, the generated CSI cannot be interpreted by human and be interpreted by the corresponding decoder. Therefore, it is not straight forward on how to configure CBSR for such AE-based CSI feedback generation.

Figure 14:
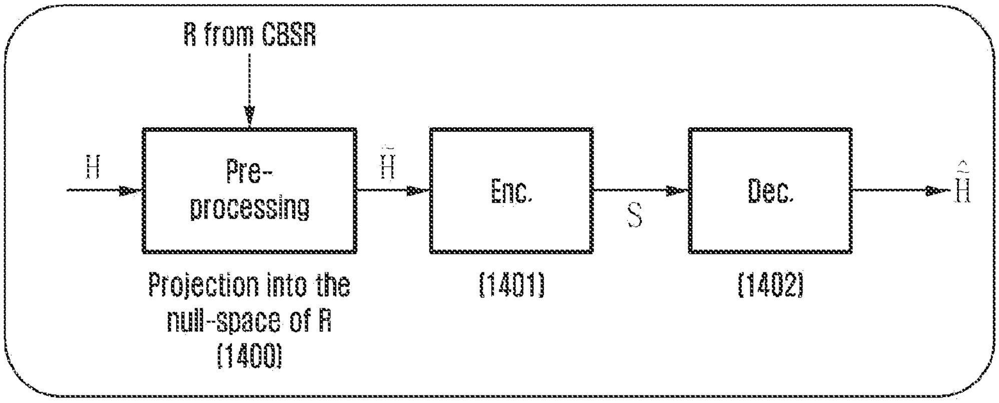
FIG. 14 illustrates an exemplary application of CBSR based on preprocessing for AI-based CSI generation according to an embodiment of the present disclosure.

FIG. 14 illustrates an exemplary application of CBSR based on preprocessing for AI-based CSI generation according to an embodiment of the present disclosure.

As one aspect of the disclosure, the gNB may configure the UE with CSI-RS port or antenna ports configuration for AI/ML based CSI. This configuration may include antenna ports or panel configurations. One example of antenna port configuration may be the number of CSI-RS (antenna) ports in the two dimensions which is configured by the parameter $N_1$ and $N_2$. Moreover, even if the AI/ML based CSI as shown in FIG. 14 does not have structure, implying the precoder vectors cannot be resolved in to 2D-DFT beams, for the sake of CBSR, 2D-DFT beams can be consider by the UE. Similar to the legacy system, the oversampling factors for the construction of 2D-DFT beams can be specified. Let $O_1$ and $O_2$ be the oversampling factors for the construction of the 2D-DFT beams. Then, the gNB can indicate the restricted vectors $\{r_1, r_2, \ldots, r_K\}$ where $r_k \in \{v_{l,m}\}$ for $k \in \{1, 2, \ldots, K\}$, $l=\{0, 1, \ldots, N_1O_1-1\}$ and $m=\{0, 1, 2, \ldots, N_2O_2-1\}$. The 2D-DFT beams are also given as equation 6:

$$u_m = \begin{cases} \begin{bmatrix} 1 & e^{j\frac{2\pi m}{O_2N_2}} & \ldots & e^{j\frac{2\pi m(N_2-1)}{O_2N_2}} \end{bmatrix} & N_2 > 1 \\ 1 & N_2 = 1 \end{cases} \quad \text{[Equation 6]}$$

$$v_{l,m} = \begin{bmatrix} u_m & e^{j\frac{2\pi l}{O_1N_1}} u_m & \ldots & e^{j\frac{2\pi l(N_1-1)}{O_1N_1}} u_m \end{bmatrix}^T$$

In an embodiment, the indication of the restricted vectors $\{r_1, r_2, \ldots, r_K\}$ may be via a bit map sequence $a_{A_c-1} \ldots a_1a_0$ of length $A_c=O_1N_1O_2N_2$ where a bit value of zero indicates that the corresponding DFT vector $v_{l,m}$ is restricted.

In another embodiment, the configuration of CBSR may be by indicating K restricted vectors among $A_c=O_1N_1O_2N_2$ candidates in a combinatorial manner. In particular, a CBSR indicator, $$i_{CBSR} = 0, 1, \ldots, \binom{A_c}{K} - 1$$

indicates the K restricted vectors $\{r_1, r_2, \ldots, r_K\}$. The bitwidth of such indicator is given as $$\left\lceil \log_2\binom{A_c}{K} \right\rceil.$$

Such indication reduces the configuration bits as compared to the bitmap based configuration which requires Ac bits.

Upon receiving of CBSR via restriction of a certain set of 2D-DFT beams given as $\{r_1, r_2, \ldots, r_K\}$, a UE may perform a certain preprocessing operations 1400 on the estimated channel. One exemplary embodiment of the disclosure, the UE may be allowed to project the estimated channel H into the null space of a CBSR matrix R. As an example, the CBSR matrix may be formed from the restricted vectors as $$R = \begin{bmatrix} r_1 \ldots r_K & 0 \\ 0 & r_1 \ldots r_K \end{bmatrix}.$$

Then the UE may project the channel matrix H into the null space of R as $\tilde{H}=(I-R(R^H R)^{-1}R^H$ where I is an identity matrix of size $N_{TX}=2N_1N_2$. The UE encodes $\tilde{H}$ 1401 and generates CSI. The gNB takes the CSI in terms of a bit stream and decodes the CSI 1402 and reconstructs a precoder. Such operation is different from the legacy operations performed by the UE upon CBSR configurations. In legacy system the UE simply avoids reporting the precoder based on the restricted vectors. However, in AI-based CSI, the UE performs the preprocessing as shown 1400 on the estimated channel so that the reconstructed precoder (CSI) at the gNB avoids the transmission of power the direction of the restricted 2D-DFT beam.

Figure 15:
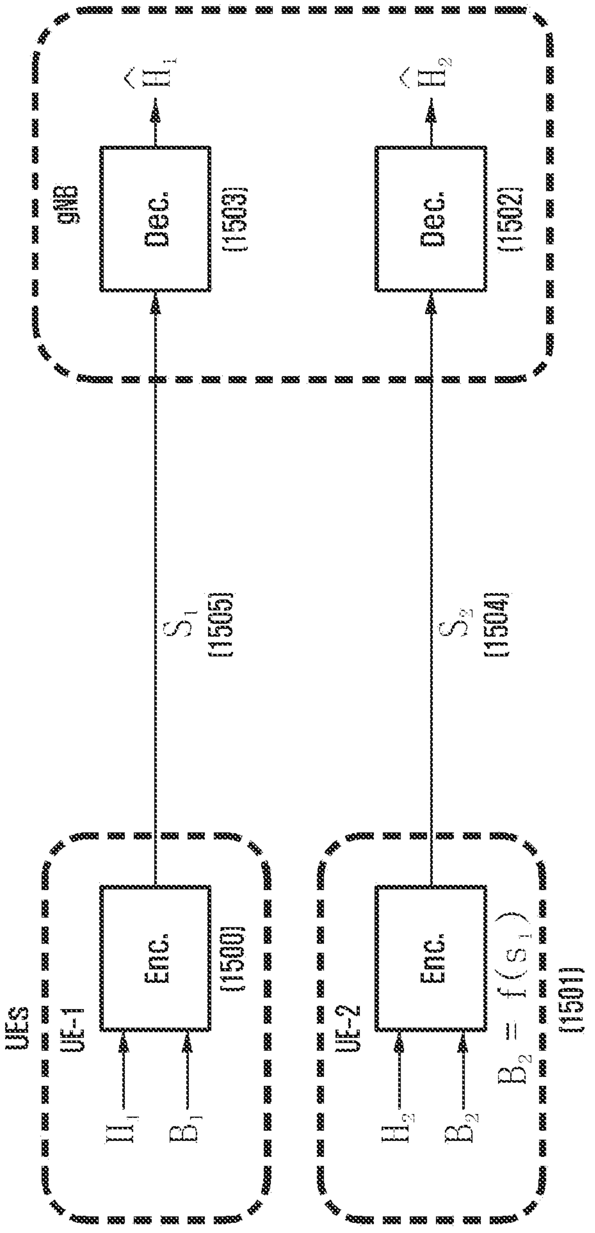
FIG. 15 illustrates an exemplary application of CBSR configuration for co-scheduled users in a multi-user multiple input multiple output (MU-MIMO) setup according to an embodiment of the present disclosure.

FIG. 15 illustrates an exemplary application of CBSR configuration for co-scheduled users in a multi-user MIMO setup, according to an embodiment of the present disclosure.

In legacy systems, a UE feedbacks the CSI from a single user (SU) MIMO point of view. In other words, the gNB may perform interference cancelation techniques such as zero-forcing to produce the appropriate multi-user precoders from the reported precoders. Such operation is not optimal and incurs some loss when the reported precoders are non-orthogonal. One way of solving this is full channel matrix reporting by the UE. However, such full channel matrix reporting incurs a large reporting overhead.

To solve the aforementioned limitations of legacy system, the reported precoder may be generated by considering other co-scheduled UEs. Referring to FIG. 15, the CBSR for UE-1 and UE-2 are given as a sequences of bits $B_1$ and $B_2$. These bit sequences are interpretable by the corresponding encoders 1500 and 1501 and are a direct input of the AI-based encoder. Moreover, the gNB may generate these bit sequences as a function of reported CSI by other UEs. The CBSR for UE-2 1501 denoted as $B_2$ can be generated as a function of the CSI output of UE-1 1505 denoted by $s_1$. The CBSR for UE-1 1500 denoted as $B_1$ may be generated as a function of the CSI output of UE-2 1504 denoted by $s_2$. Decoders 1502, 1503 of the gNB may decode the CSI output $s_1$ and $s_2$, respectively.

The embodiment in FIG. 15 is for example purpose and it may be extended to more than 2 co-scheduled UEs. When more than 2 UEs are co-scheduled, the CBSR of one user is formed as a function of the CSI report of multiple UEs.

Moreover, the CBSR generated by considering other co-scheduled UEs may be indicated to the UE in a more dynamic manner via MAC-CE or downlink control information (DCI) signaling. Such dynamic indication may help the UE to generate the CSI by considering the dynamic channel state information of other UEs. Furthermore, the function to generate the CBSR bits $B_k$ for k-th user from the CSI reports of other users $\{s_1, s_2, \ldots, s_K\}$ given as $f(s_1, s_2, \ldots s_K)$ can be implemented based on artificial intelligence. One method of such generation is to use an auto-encoder to generate the CBSR bit sequence similar to the generation of $\{s_1, s_2, \ldots, s_K\}$.

Figure 16:
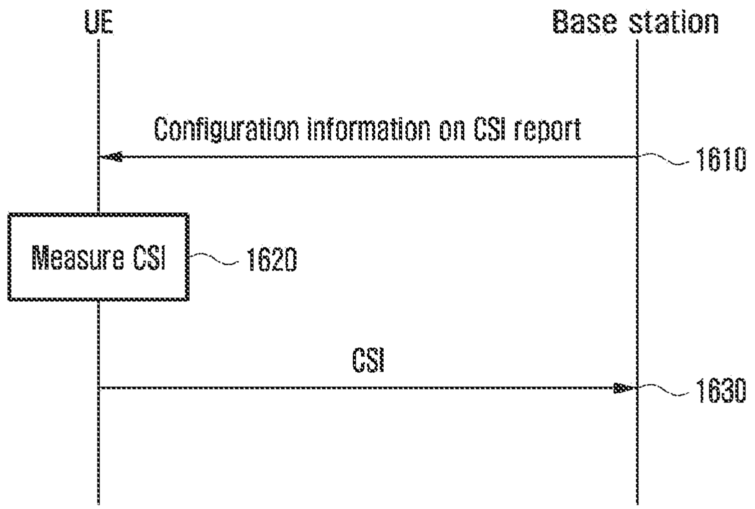
FIG. 16 illustrates a signaling flow between a UE and a base station according to an embodiment of the present disclosure.

FIG. 16 illustrates a signaling flow between a UE and a base station according to an embodiment of the present disclosure.

Referring to FIG. 16, in operation 1610, the UE may receive configuration information on a CSI report. The base station may transmit configuration information on the CSI report. The configuration information may include information on a CBSR.

For example, the CBSR may be configured to each TRP of a plurality of TRPs performing CJT based on the information on the CBSR. Alternatively, the CBSR may be configured to a subset of the plurality of TRPs based on the information on the CBSR. Alternatively, the CBSR may be configured to all of the plurality of TRPs based on the information on the CBSR.

For example, the information on the CBSR may include a first bit sequence indicating vector groups of each TRP that are restricted to report and a second bit sequence indicating maximum amplitude coefficients corresponding to the vector groups, in case that the CBSR is configured to each TRP.

For example, the information on the CBSR may include a first bit sequence indicating at least one TRP to apply the codebook subset restriction, a second bit sequence indicating restricted vector groups of the at least one TRP and a third bit sequence indicating maximum amplitude coefficients corresponding to the restricted vector groups, in case that the CBSR is configured to the subset of the plurality of TRP based on the information.

For example, the information on the CBSR may include restriction information associated with amplitude coefficients for the plurality of TRPs. The restriction information may comprise a bit sequence indicating maximum amplitude coefficient calculated based on an average value of maximum amplitude coefficients across the plurality of TRPs.

In operation 1620, the UE may measure CSI based on at least one CSI-RS resource. The at least CSI-RS resource may be received from the base station.

In operation 1630, the UE may transmit the CSI based on the CBSR. The base station may receive the CSI based on the CBSR. For example, the CSI may include at least one of a PMI, a channel quality indicator (CQI) or a rank indicator (RI).

According to an embodiment of the disclosure, a codebook subset restriction can be applied to a CSI reporting for coherent joint transmission from multiple TRPs.

Further, according to an embodiment of the disclosure, a codebook subset restriction can be applied to a CSI reporting for time-correlated CSI wherein the CSI is compressed in time or doppler domain.

Further, according to an embodiment of the disclosure, a codebook subset restriction can be applied to a CSI reporting for a CSI generated based on an AI/ML.

Effects that can be obtained in the disclosure are not limited to the above-described effects, and other unmentioned effects will be able to be clearly understood by those of ordinary skill in the art to which the disclosure pertains.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable read only memory (EEPROM), a magnetic disc storage device, a CD-ROM, DVDs, other type optical storage devices, or a magnetic cassette. Alternatively, any combination of some or all of the memory devices may form a memory in which the program is stored. Further, a plurality of such memories may be included in the electronic device.

In addition, the programs may be stored in an attachable storage device which may access the electronic device through communication networks such as the Internet, Intranet, a local area network (LAN), a wide LAN (WLAN), and a storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a BS and a UE. As an example, embodiments of the disclosure described herein may be combined with each other to operate a BS and a UE.

Various embodiments of the disclosure have been described. The above description of the disclosure is used for exemplification, and the embodiments of the disclosure are not limited to the disclosed embodiments. Those skilled in the art would understand that the disclosure can be easily modified to other detailed forms without changing the technical idea or an essential feature thereof. The scope of the disclosure is represented by the claims to be described below rather than the detailed description, and it is to be interpreted that the meaning and scope of the claims and all the changes or modified forms derived from the equivalents thereof fall within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:

receiving configuration information for a channel state information (CSI) report including information on a codebook subset restriction for coherent joint transmission (CJT) CSI;

measuring CSI based on CSI-RS resources corresponding to a plurality of transmission reception points (TRPs) performing CJT; and transmitting the CSI based on the information on the codebook subset restriction, wherein the information on the codebook subset restriction for the CJT CSI comprises a plurality of bit sequences, each bit sequence corresponding to one of the plurality of TRPs, wherein whether the codebook subset restriction is applied to each TRP is determined based on one of the plurality of bit sequences corresponding to each TRP, and wherein each bit sequence is formed by concatenating a first bit sequence indicating vector groups of each TRP to which the codebook subset restriction is applied and a second bit sequence indicating a maximum average coefficient amplitude corresponding to the vector groups.

2. The method of claim 1, wherein the information on the codebook subset restriction for the CJT CSI includes restriction information associated with amplitude coefficients for the plurality of TRPs, and wherein the restriction information comprises a bit sequence indicating a maximum amplitude coefficient calculated based on an average value of maximum amplitude coefficients across the plurality of TRPs.

3. The method of claim 1, wherein the configuration information further includes information on a codebook subset restriction for time-correlated CSI, the time-correlated CSI being compressed either in a time domain or a Doppler domain, and wherein a maximum amplitude coefficient indicated by the information on the codebook subset restriction for time-correlated CSI is calculated based on an average value of maximum amplitude coefficients across basis vectors of the time domain or the Doppler domain.

4. The method of claim 1, wherein a number N of the plurality of bit sequences is identical to a number of the plurality of TRPs, and wherein r-th bit sequence of the plurality of bit sequences is for r-th TRP of the plurality of TRPs, where $r \in \{1, \ldots, N\}$.

5. A method performed by a base station in a wireless communication system, the method comprising:

transmitting, to a user equipment (UE), configuration information for a channel state information (CSI) report including information on a codebook subset restriction for coherent joint transmission (CJT) CSI;

transmitting, to the UE, a CSI-RS on CSI-RS resources corresponding to a plurality of transmission reception points (TRPs) performing CJT; and receiving, from the UE, CSI based on the information on the codebook subset restriction, wherein the CSI is derived based on the CSI-RS resources, wherein the information on the codebook subset restriction for the CJT CSI comprises a plurality of bit sequences, each bit sequence corresponding to one of the plurality of TRPs, wherein whether the codebook subset restriction is applied to each TRP is determined based on one of the plurality of bit sequences corresponding to each TRP, and wherein each bit sequence is formed by concatenating a first bit sequence indicating vector groups of each TRP to which the codebook subset restriction is applied and a second bit sequence indicating a maximum average coefficient amplitude corresponding to the vector groups.

6. The method of claim 5, wherein the information on the codebook subset restriction for the CJT CSI includes restriction information associated with amplitude coefficients for the plurality of TRPs, and wherein the restriction information comprises a bit sequence indicating a maximum amplitude coefficient calculated based on an average value of maximum amplitude coefficients across the plurality of TRPs.

7. The method of claim 5, wherein the configuration information further includes information on a codebook subset restriction for time-correlated CSI, the time-correlated CSI being compressed either in a time domain or a Doppler domain, and wherein a maximum amplitude coefficient indicated by the information on the codebook subset restriction for time-correlated CSI is calculated based on an average value of maximum amplitude coefficients across basis vectors of the time domain or the Doppler domain.

8. A user equipment (UE) in a wireless communication system, the UE comprising:

a transceiver; and a controller coupled with the transceiver and configured to:

receive configuration information for a channel state information (CSI) report including information on a codebook subset restriction for coherent joint transmission (CJT) CSI, measure CSI based on CSI-RS resources corresponding to a plurality of transmission reception points (TRPs) performing CJT, and transmit the CSI based on the information on the codebook subset restriction, wherein the information on the codebook subset restriction for the CJT CSI comprises a plurality of bit sequences, each bit sequence corresponding to one of the plurality of TRPs, wherein whether the codebook subset restriction is applied to each TRP is determined based on one of the plurality of bit sequences corresponding to each TRP, and wherein each bit sequence is formed by concatenating a first bit sequence indicating vector groups of each TRP to which the codebook subset restriction is applied and a second bit sequence indicating a maximum average coefficient amplitude corresponding to the vector groups.

9. The UE of claim 8, wherein the information on the codebook subset restriction for the CJT CSI includes restriction information associated with amplitude coefficients for the plurality of TRPs, and wherein the restriction information comprises a bit sequence indicating a maximum amplitude coefficient calculated based on an average value of maximum amplitude coefficients across the plurality of TRPs.

10. The UE of claim 8, wherein the configuration information further includes information on a codebook subset restriction for time-correlated CSI, the time-correlated CSI being compressed either in a time domain or a Doppler domain, and wherein a maximum amplitude coefficient indicated by the information on the codebook subset restriction for time-correlated CSI is calculated based on an average value of maximum amplitude coefficients across basis vectors of the time domain or the Doppler domain.

11. A base station in a wireless communication system, the base station comprising:

a transceiver; and a controller coupled with the transceiver and configured to:

transmit, to a user equipment (UE), configuration information for a channel state information (CSI) report including information on a codebook subset restriction for coherent joint transmission (CJT) CSI, transmit, to the UE, a CSI-RS on CSI-RS resources corresponding to a plurality of transmission reception points (TRPs) performing CJT, and receive, from the UE, CSI based on the information on the codebook subset restriction, wherein the CSI is derived based on the CSI-RS resources, wherein the information on the codebook subset restriction for the CJT CSI comprises a plurality of bit sequences, each bit sequence corresponding to one of the plurality of TRPs, wherein whether the codebook subset restriction is applied to each TRP is determined based on one of the plurality of bit sequences corresponding to each TRP, and wherein each bit sequence is formed by concatenating a first bit sequence indicating vector groups of each TRP to which the codebook subset restriction is applied and a second bit sequence indicating a maximum average coefficient amplitude corresponding to the vector groups.

12. The base station of claim 11, wherein the information on the codebook subset restriction for the CJT CSI includes restriction information associated with amplitude coefficients for the plurality of TRPs, and wherein the restriction information comprises a bit sequence indicating a maximum amplitude coefficient calculated based on an average value of maximum amplitude coefficients across the plurality of TRPs.

* * * * *